(12) United States Patent
Amidon et al.

(10) Patent No.: US 11,499,803 B2
(45) Date of Patent: *Nov. 15, 2022

(54) BALLISTIC PANEL

(71) Applicant: 360° Ballistics, LLC, Wake Forest, NC (US)

(72) Inventors: Clayton Dean Amidon, Zebulon, NC (US); Mark Alan Siver, Youngsville, NC (US)

(73) Assignee: 360° BALLISTICS, LLC, Wake Forest, NC (US)

( * ) Notice: Subject to any disclaimer, the term of this patent is extended or adjusted under 35 U.S.C. 154(b) by 91 days.

This patent is subject to a terminal disclaimer.

(21) Appl. No.: 17/085,697

(22) Filed: Oct. 30, 2020

(65) Prior Publication Data

US 2021/0239433 A1    Aug. 5, 2021

Related U.S. Application Data

(63) Continuation of application No. 15/434,847, filed on Feb. 16, 2017, now Pat. No. 10,823,535, and a
(Continued)

(51) Int. Cl.
*F41H 5/04* (2006.01)
*F41H 5/24* (2006.01)
(Continued)

(52) U.S. Cl.
CPC .............. *F41H 5/24* (2013.01); *B23P 6/00* (2013.01); *E04C 2/044* (2013.01); *E04G 23/0211* (2013.01); *F41H 5/0414* (2013.01)

(58) Field of Classification Search
CPC . F41H 5/24; F41H 5/0414; B23P 6/00; E04C 2/044; E04G 23/0211
See application file for complete search history.

(56) References Cited

U.S. PATENT DOCUMENTS 4,046,582 A    9/1977  Kawamura et al.
4,075,808 A    2/1978  Pearlman
(Continued)

FOREIGN PATENT DOCUMENTS

WO    2012020229 A1    2/2012

OTHER PUBLICATIONS www.graceconstruction.com, Grace Concrete Products Darafill Dry Controlled low strength material perfomance additive. (Year: 2007).
(Continued)

*Primary Examiner* — Rick K Chang
(74) *Attorney, Agent, or Firm* — Neo IP

(57) ABSTRACT

A ballistic panel formed with a ballistic material, the panel comprising: a panel with a filled void; wherein the filled void is filled with a ballistic replacement material; and wherein the filled void exhibits ballistic properties equivalent to the ballistic panel formed with the ballistic material; wherein the ballistic replacement material and the ballistic material comprise between about 1121 kg/cubic meter (about 70 pounds per cubic foot) and about 1442 kg/cubic meter (about 90 pounds per cubic foot); and wherein the ballistic replacement material and the ballistic material comprise: about 1 part by mass Portland cement; about 0.5 to 1.5 part by mass fine aggregate; and about 0.0005 to 0.05 part by mass air entrainment additive; about 0.005 to 0.15 part by mass fiber; about 0.005 to 0.05 part by mass aluminum hydroxide and about 0.005 to 0.05 part by mass calcium phosphate.

20 Claims, 19 Drawing Sheets

Related U.S. Application Data continuation-in-part of application No. 14/268,435, filed on May 2, 2014, now Pat. No. 9,604,321.

(60) Provisional application No. 62/352,700, filed on Jun. 21, 2016, provisional application No. 61/818,873, filed on May 2, 2013.

(51) Int. Cl.
*E04G 23/02* (2006.01)
*E04C 2/04* (2006.01)
*B23P 6/00* (2006.01)

(56) References Cited

U.S. PATENT DOCUMENTS

| | | | |
|---|---|---|---|
| 4,249,948 A | 2/1981 | Okada et al. | |
| 4,391,664 A | 7/1983 | Kramer | |
| 4,488,910 A | 12/1984 | Nicholson et al. | |
| 4,683,800 A | 8/1987 | Snedeker | |
| 4,737,193 A | 4/1988 | Gutmann et al. | |
| 4,979,425 A | 12/1990 | Sprague | |
| 5,131,791 A | 7/1992 | Kitziller | |
| 5,456,752 A | 10/1995 | Hogan | |
| 5,976,656 A | 11/1999 | Giraud | |
| 6,244,009 B1 | 6/2001 | Cerrato | |
| 6,264,735 B1 | 7/2001 | Bean et al. | |
| 6,423,134 B1 | 7/2002 | Trottier et al. | |
| 6,568,310 B2 | 5/2003 | Morgan | |
| 6,582,511 B1 | 6/2003 | Velpari | |
| 6,620,236 B2 | 9/2003 | Huntsman et al. | |
| 6,688,811 B2 | 2/2004 | Forrester | |
| 6,758,020 B2 | 7/2004 | Cerrato | |
| 6,758,897 B2 | 7/2004 | Rieder et al. | |
| 6,782,673 B2 | 8/2004 | Azar | |
| 6,972,100 B2 | 12/2005 | Minke et al. | |
| 7,111,847 B2 | 9/2006 | Larson et al. | |
| 7,243,921 B2 | 7/2007 | Larson et al. | |
| 7,357,394 B2 | 4/2008 | Halverson | |
| 7,562,613 B2 | 7/2009 | Ahmad | |
| 7,628,104 B2 | 12/2009 | Warren et al. | |
| 7,677,151 B2 | 3/2010 | Ahmad | |
| 7,748,307 B2 | 7/2010 | Hallissy et al. | |
| 7,845,266 B2 | 12/2010 | Duke et al. | |
| 7,849,780 B1 | 12/2010 | Hallissy et al. | |
| 8,043,982 B2 | 10/2011 | Telander | |
| D662,225 S | 6/2012 | Amidon et al. | |
| 8,479,464 B2 | 7/2013 | Holzworth | |
| 8,959,862 B1 | 2/2015 | Kreizinger | |
| 9,021,761 B2 | 5/2015 | Riccobene et al. | |
| 9,074,850 B2 | 7/2015 | Bergiadis | |
| 9,121,675 B1 | 9/2015 | Amidon et al. | |
| 9,440,883 B1 | 9/2016 | Brien | |
| 2007/0062143 A1 | 3/2007 | Noushad | |
| 2008/0092471 A1 | 4/2008 | Ahmad | |
| 2008/0275149 A1 | 11/2008 | Ladely et al. | |
| 2009/0049778 A1 | 2/2009 | Kralic et al. | |
| 2009/0162626 A1 | 6/2009 | Konishi et al. | |
| 2009/0169855 A1 | 7/2009 | Tunis | |
| 2009/0282969 A1 | 11/2009 | Ahmad | |
| 2009/0293711 A1 | 12/2009 | Altergott et al. | |
| 2010/0083819 A1 | 4/2010 | Mann et al. | |
| 2010/0229715 A1 | 9/2010 | Tonyan et al. | |
| 2010/0230035 A1 | 9/2010 | Frank et al. | |
| 2010/0326336 A1 | 12/2010 | Struthers et al. | |
| 2011/0107904 A1* | 5/2011 | Queheillalt | F41H 5/0457 264/249 |
| 2013/0012625 A1 | 1/2013 | Li et al. | |
| 2014/0116235 A1 | 5/2014 | Berroth et al. | |
| 2014/0150362 A1 | 6/2014 | Propst | |
| 2015/0315798 A1 | 11/2015 | Propst | |
| 2016/0289121 A1 | 10/2016 | Coleman | |
| 2017/0160059 A1 | 6/2017 | Amidon et al. | |
| 2017/0234659 A1 | 8/2017 | Amidon et al. | |

OTHER PUBLICATIONS

Hudson, Kenneth L. et al., Final Report Demonstration of Shock-Absorbing Concrete (SACON) Bullet Trap Technology (Report No. ATC-8183), Aug. 1999, 219 pages, U.S. Army Environmental Center, Aberdeen Proving Ground, MD 21010-5401.

Technical Specification for Shock Absorbing Concrete (SACON. RTM.)—Shock Absorbing Concrete for Constructing Live-Fire Training Facilities, Document metadata bears creation date of Feb. 12, 2007, 25 pages, U.S. Army Corps of Engineers.

Whiting, David A., Manual on Control of Air Content in Concrete, 1998, 52 pages, Portland Cement Association, Skokie, Illinois, USA.

\* cited by examiner

200

200

1200

1200

1200

3000

| 3004 | Spray replacement material |
| 3008 | Process plug area |
| 3012 | Process vent hole |
| 3016 | Allow repaired area to partially set |
| 3020 | Spay with water |
| 3024 | Cover repaired area |
| 3028 | Mark as No-Shoot |
| 3032 | Test the test cylinder |
| 3036 | Remove cover and No-Shoot marks |

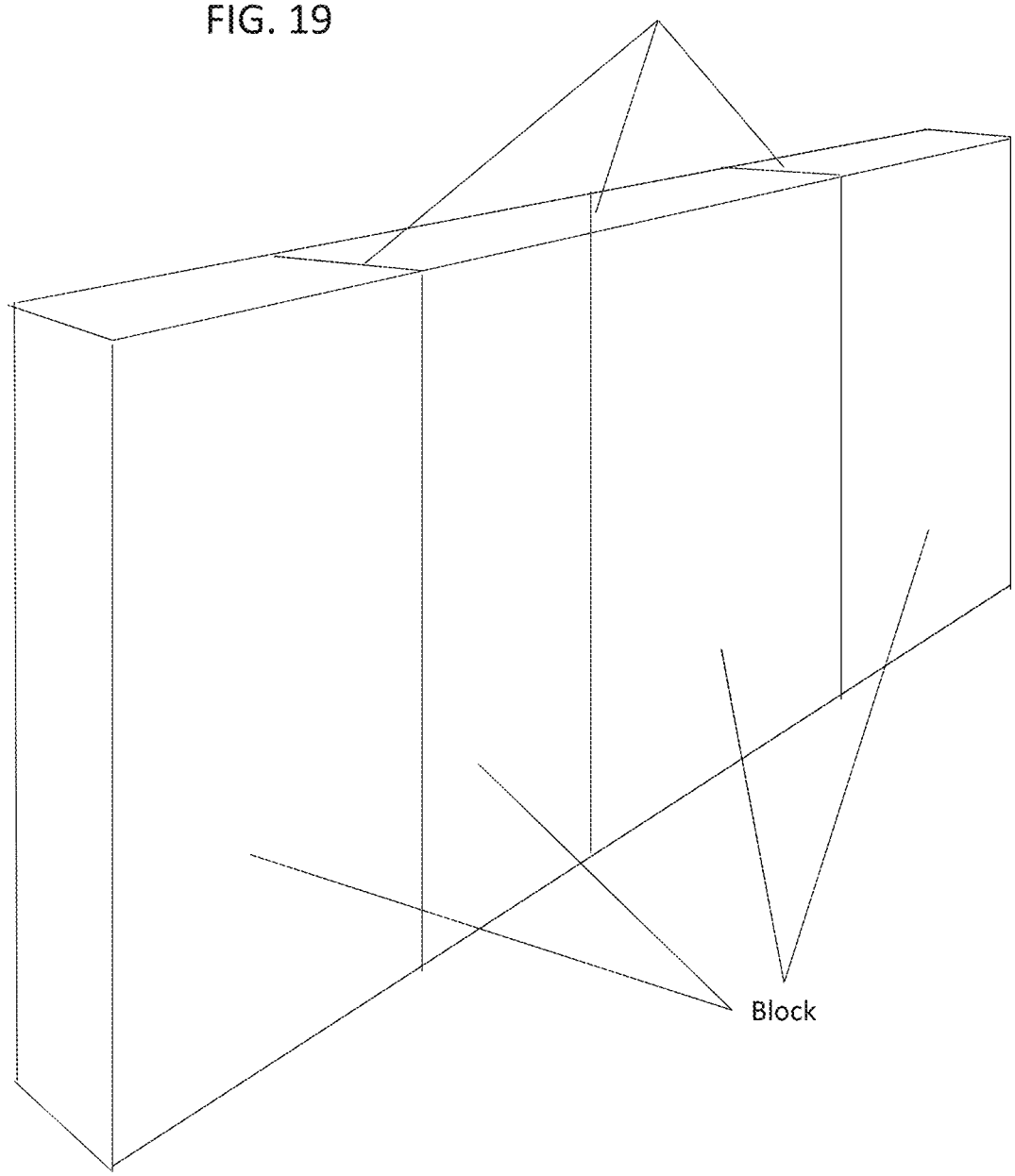

BALLISTIC PANEL

CROSS REFERENCE TO RELATED APPLICATIONS

This nonprovisional utility patent application is related to and claims priority from one or more prior filed nonprovisional and provisional applications. The present application is a continuation of U.S. application Ser. No. 15/434,847, filed Feb. 16, 2017, which is a continuation-in-part of U.S. application Ser. No. 14/268,435 filed May 2, 2014, which claims the benefit of U.S. Provisional Patent Application No. 61/818,873 filed May 2, 2013, each of which is incorporated herein by reference in its entirety. The present application also claims priority to and the benefit of U.S. Provisional Patent Application No. 62/352,700, filed Jun. 21, 2016, which is incorporated herein by reference in its entirety.

BACKGROUND OF THE INVENTION

Field of the Invention

This disclosure relates generally to equipment and methods to repair concrete barriers, in particular ballistic concrete barriers used for training facilities used for training with live ammunition.

SUMMARY OF THE DISCLOSURE

This summary is meant to provide an introduction to the concepts that are disclosed within the specification without being an exhaustive list of the many teachings and variations upon those teachings that are provided in the extended discussion within this disclosure. Thus, the contents of this summary should not be used to limit the scope of the claims that follow.

Inventive concepts are illustrated in a series of examples, some examples showing more than one inventive concept. Individual inventive concepts can be implemented without implementing all details provided in a particular example. It is not necessary to provide examples of every possible combination of the inventive concepts provide below as one of skill in the art will recognize that inventive concepts illustrated in various examples can be combined together in order to address a specific application.

The present invention relates to ballistic panels with filled voids. The filled voids are filled with a ballistic replacement material, and the filled voids exhibit ballistic properties equivalent to the ballistic panel.

It is an object of this invention to provide a ballistic panel formed with a ballistic material, the panel including a panel with a filled void filled with a ballistic replacement material; and wherein the filled void exhibits ballistic properties equivalent to the ballistic panel formed with the ballistic material, and wherein the ballistic replacement material and the ballistic material comprise between about 1121 kg/cubic meter (about 70 pounds per cubic foot) and about 1442 kg/cubic meter (about 90 pounds per cubic foot); and wherein the ballistic replacement material and the ballistic material comprise: about 1 part by mass Portland cement; about 0.5 to 1.5 part by mass fine aggregate; and about 0.0005 to 0.05 part by mass air entrainment additive; about 0.005 to 0.15 part by mass fiber; about 0.005 to 0.05 part by mass aluminum hydroxide and about 0.005 to 0.05 part by mass calcium phosphate.

These and other aspects of the present invention will become apparent to those skilled in the art after a reading of the following description of the preferred embodiment when considered with the drawings, as they support the claimed invention.

Other systems, methods, features and advantages of the disclosed teachings will be or will become apparent to one with skill in the art upon examination of the following figures and detailed description. It is intended that all such additional systems, methods, features and advantages be included within the scope of and be protected by the accompanying claims.

BRIEF DESCRIPTION OF THE FIGURES

The disclosure can be better understood with reference to the following figures. The components in the figures are not necessarily to scale, emphasis instead being placed upon illustrating the principles of the disclosure. Moreover, in the figures, like reference numerals designate corresponding parts throughout the different views.

FIG. 19 illustrates an example embodiment of blocks with two beveled edges according to the present invention.

DETAILED DESCRIPTION

Figure 1:
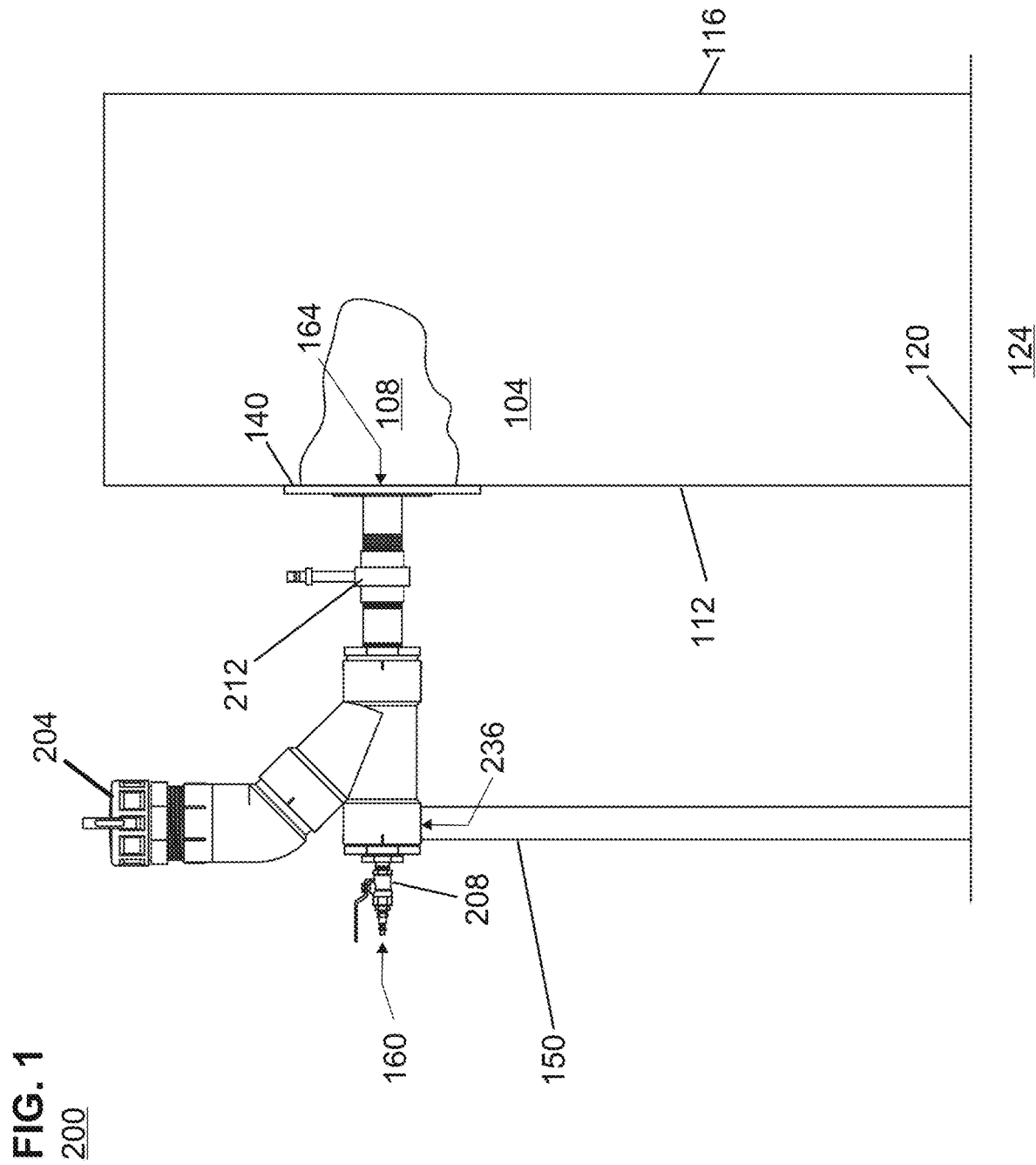
FIG. 1 is a side view of a first injector assembly positioned to fill a void in a ballistic panel.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

Referring now to the drawings in general, the illustrations are for the purpose of describing a preferred embodiment of the invention and are not intended to limit the invention thereto.

The present disclosure teaches the creation of components made from wet ballistic concrete prepared without an addition of preformed foam, as disclosed in U.S. Pat. No. 9,121,675 issued Sep. 1, 2015 by Amidon et al for Barrier for Absorbing Live Fire Ammunition and Uses Thereof; U.S. patent application Ser. No. 14/268,435, filed May 2, 2014 by Amidon et al. for Repair of Ballistic Concrete Panels; and U.S. patent application Ser. No. 13/449,420, filed Apr. 18, 2012 by Amidon et al. for Barrier for Absorbing Very High Power Bullets and Uses Thereof; all incorporated herein by reference in their entirety.

FIG. 1 is a side view of an injector assembly connected to a ballistic panel with a void. More specifically, FIG. 1 shows a ballistic panel 104 with a base 120 on the ground 124 or some other support surface. A proximal face 112 of the ballistic panel 104 has a void 108 extending from the proximal face 112 a portion of the distance to the distal face 116. Ballistic panels 104 may be used in live-fire training where a series of panels are used to create one or more structures such as a building or a faux tank to allow military or police personnel to train with live ammunition. The ballistic panels are designed to receive the projectile and retain the projectile so that trainees are not injured by ricochets. The ballistic panels 104 may also be used as backstops or safety barriers behind conventional targets or behind ballistic panel shoot houses or other structures.

The ballistic panels 104 may be used in a variety of sizes. The ballistic panels 104 may have a thickness between the proximal face 112 and the distal face 116 of approximately 24 to 30 inches. The thickness may be selected based upon the properties of the ballistic concrete used for the ballistic panel 104 and the anticipated kinetic energy of the ammunition. Thus, a ballistic panel for a backstop behind a pistol range may be a different thickness from a ballistic panel intended to stop rounds from a M-16 rifle (sometimes called AR-15 rifle), or to stop rounds from a 50 caliber machine gun or sniper rifle.

Repeated hits of a ballistic panel 104 in approximately the same location will degrade the panel and begin to create a void 108. In order to maintain the integrity of the ballistic panel 104 as a barrier, these voids 108 need to be filled with material compatible with the purpose of the ballistic panel as a bullet absorbing barrier.

Figure 5:
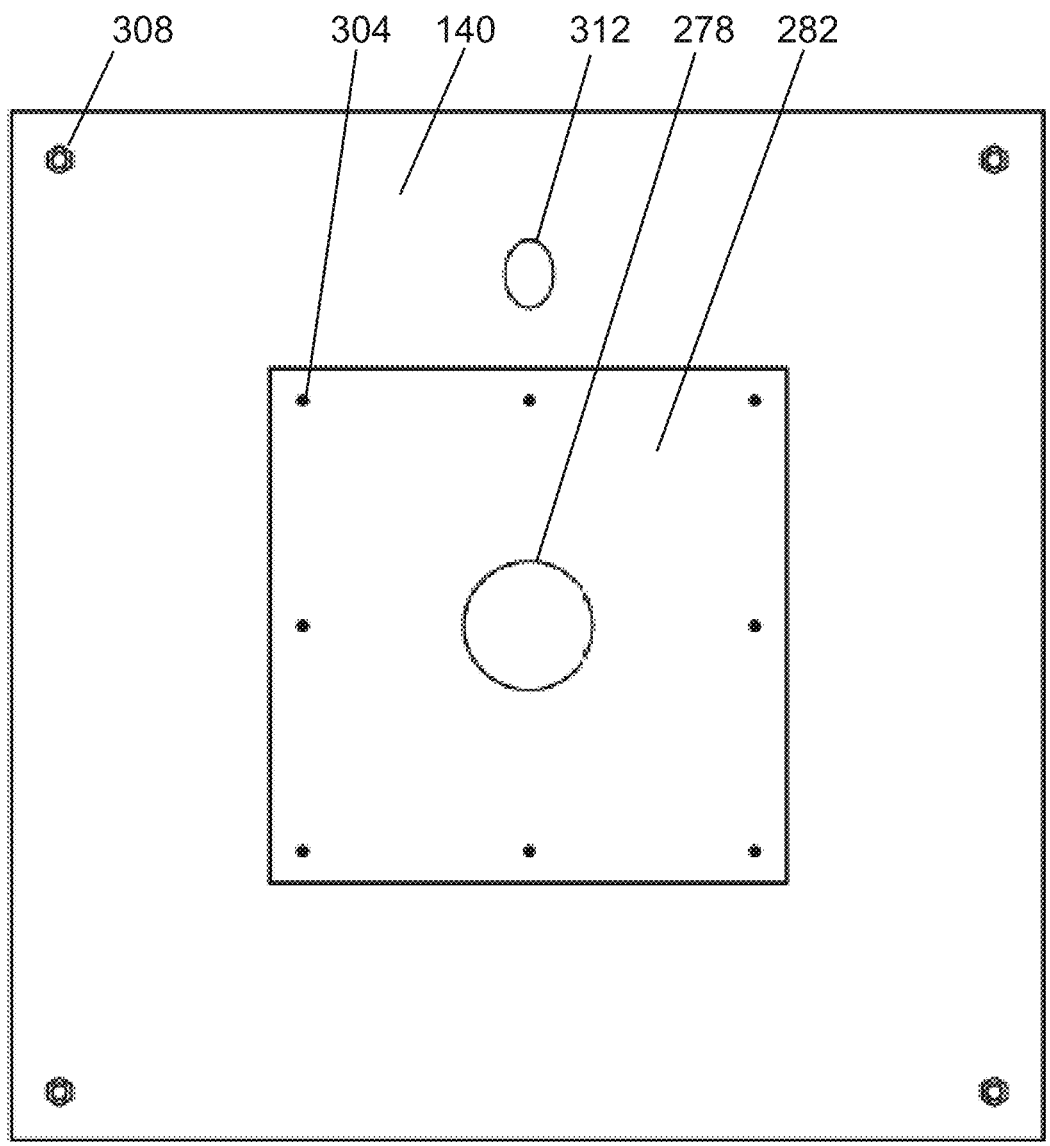
FIG. 5 shows a ballistic panel with a vent hole above the plywood faceplate, steel plate with connected second steel nipple.

FIG. 1 shows an injector assembly 200 connected to a faceplate 140 which is removably attached to the proximal face 112 of the ballistic panel 104 by a set of screws 144 (See FIG. 5). The faceplate 140 may be three quarter inch birch plywood. The screws 144 may be concrete anchors. Optionally, a support beam 150 may be cut to the size needed to support the injector assembly 200 in a substantially horizontal orientation with respect to an opening in the faceplate 140 (discussed below). The support beam 150 helps support the injector assembly 200 as the injector assembly 200 will be filled with replacement material (not shown here) loaded into the injector assembly 200 through an opening on the top end of the injector assembly 200 that is accessible after removing a cap 204. Once the injector assembly 200 is at least partially filled with replacement material and the cap 204 replaced, air pressure may be used to inject the replacement material into the void through the use of inlet valve 208 and outlet valve 212.

Figure 2:
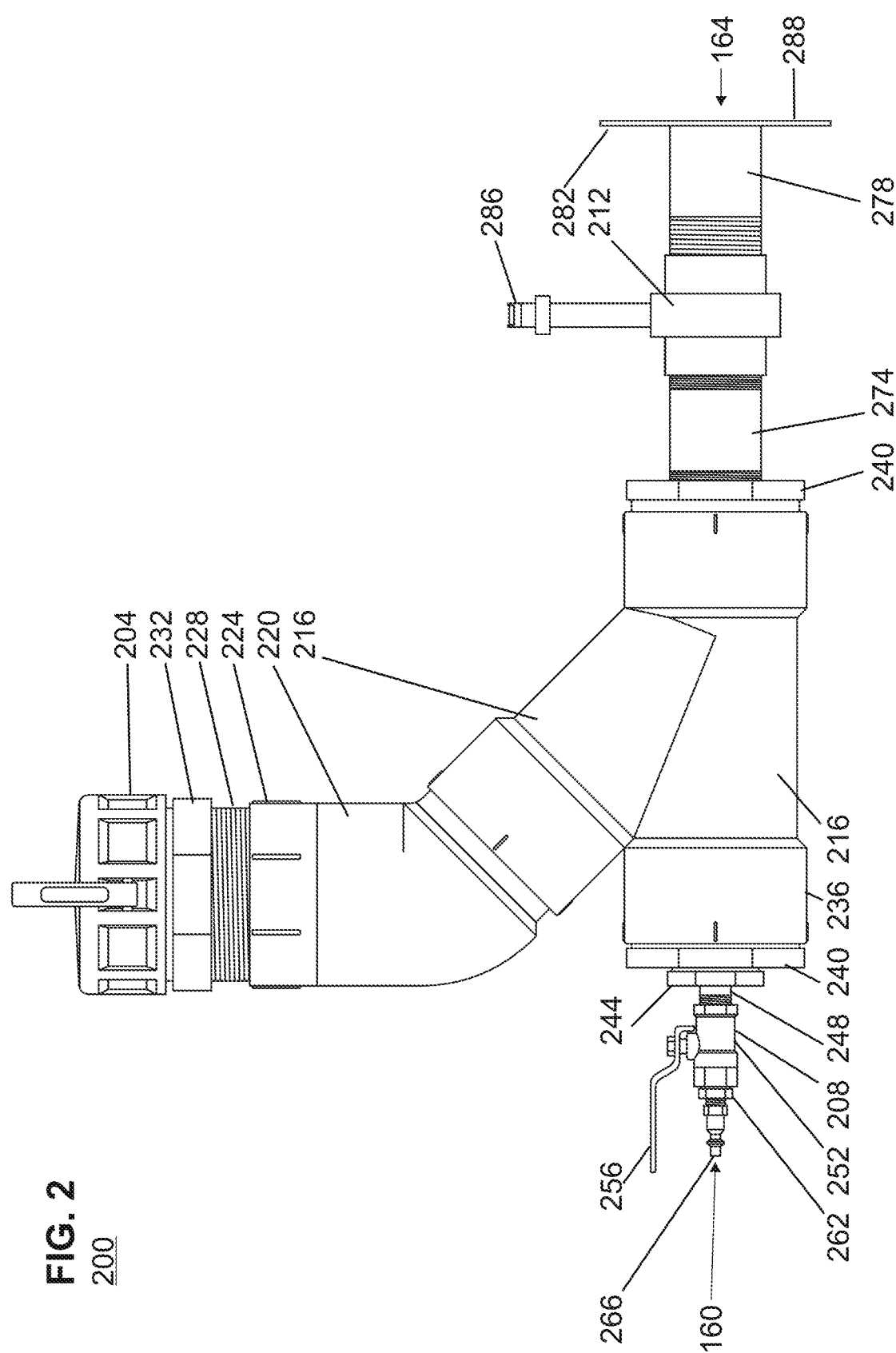
FIG. 2 is a side view of the first injector assembly.

FIG. 2 is a side view of the injector assembly 200. The majority of the interior volume for receipt of replacement material is found within wye 216 and forty-five degree elbow 220 (hereinafter elbow 220). The injector assembly 200 shown in FIG. 2 uses PVC pipe and a variety of metallic components. One of skill in the art knows that when switching from PVC pipe materials to metal components there is often an adapter. If someone built an entire injector assembly out of brass or some other metal, the injector assembly may lack certain adapters as they would not be needed.

FIG. 2 shows the use of a four inch PVC wye which is schedule 80. The nominal pipe sizes and schedules are part of the North American set of standard sizes for pipes where the pipe size is a nominal diameter and the schedule indicates wall thickness.

FIG. 2 shows an elbow 220 that is also a four inch PVC schedule 80 component. A four inch PVC adapter 224 (Schedule 40) attached to the upper end of the elbow 220 (such as by gluing). A four inch PVC nipple 228 (Schedule 80) is connected to the adapter 224. A four inch aluminum coupling adapter 232 is connected to the lower end of cap 204. A cap 204 such as a four inch aluminum dust cap along with the coupling adapter 232 may be repeatedly removed and replaced from the threaded top end of the coupling adapter 232. A preferred way to quickly remove the cap 204 from the injector assembly 200 is through the use of two-piece cap with a camlock. The lower portion of the cap 204 is threadedly engaged with the injector assembly 200 and the top portion of the cap is connected to the bottom portion of the cap with a camlock, which is a fluid fitting known to those of skill in the art for ease of rapidly disconnecting and connecting a fitting. A threaded engagement could be used to disconnect and connect the cap 204 to the injector assembly 200 as the injector assembly is repeatedly filled with replacement material, but threads may be fouled during the introduction of replacement material so a camlock may be a better choice. The combination of the cap 204 and the coupling adapter 232 may be called the cap assembly 202.

The horizontal leg of the wye 216 is shown with a pair of PVC reducer bushings 240 (Schedule 80) that reduce the diameter from a nominal four inches to a nominal two inches. On the inlet end 160 of the wye 216, reducer bushing 240 is connected to a second reducer bushing 244 which is a PVC schedule 80 reducer bushing to reduce from a two inch nominal diameter to a one half inch nominal diameter. A one half inch brass nipple 248 may be threaded into the second reducer bushing 244. An inlet valve 208 may be threadedly connected to the brass nipple 248. The inlet valve 208 may have a one half inch brass ball valve 252 with inlet valve handle 256. The inlet end 160 of the inlet valve 208 may have a one half inch to one quarter inch brass bushing 262. A one quarter inch male coupler 266 may extend from the bushing 262 to allow an air hose (not shown) from a compressed air source to be connected to the inlet valve 208.

Connected to the reducer bushing 240 on the outlet end 164 of the wye 216 is a first steel nipple 274. A second steel nipple 278 is connected to a steel plate 282. The outlet valve 212 may be connected between steel nipples 278 and 274. The outlet valve 212 may by a two inch nominal diameter PVC knife valve with outlet valve handle 286. Those of skill in the art will recognize that there are a number of different valve designs that are used with fluids but will also recognize that some valve designs are more prone to fouling from the sand and grit in the replacement material so certain valve choices will be more reliable and durable than other choices. Many of the viable choices will be types of gate valves such as knife valve, slide valve (sometimes called guillotine valve), or wedge valve. The valve may be made out of brass or some other material and those of skill in the art will be able to make any required transition from PVC piping to brass.

As discussed in greater detail below, the injector assembly 200 may have a pressure regulator before the inlet valve 208 so that the air pressure applied to the injector assembly 200 may be regulated at the inlet of the injector assembly 200 rather than relying on the operator to properly set the compressed air source to limit output to a particular prescribed pressure limit. For example the pressure regulator may be set at 25 PSIG as that pressure provides a pressure gradient to move the replacement material into the void but does not lead to applying to much pressure to the injector assembly 200. A pressure gage used without a pressure regulator may be included before the inlet valve to provide an easy to monitor indication to the operator of the pressure that will be applied to the injector assembly 200 if the inlet valve 208 is opened. This indication provides a warning to the operator that the compressed air source may need to be adjusted if the pressure gage is not indicating a pressure within a prescribed range.

Alternatively, the pressure gage may be used after the pressure regulator and before the inlet valve 208 to offer a confirmation of the proper operation of the pressure regulator.

While injector assemblies may be made of various sizes, an injector assembly 200 as shown in FIG. 2 may have a total length of approximately twenty-seven inches from the distal face 288 of steel plate 282 to the inlet end 160 of the male coupler 266. The end to end length may be longer if a pressure regulator or pressure gage is added to the inlet end of the inlet valve 208.

Figure 3:
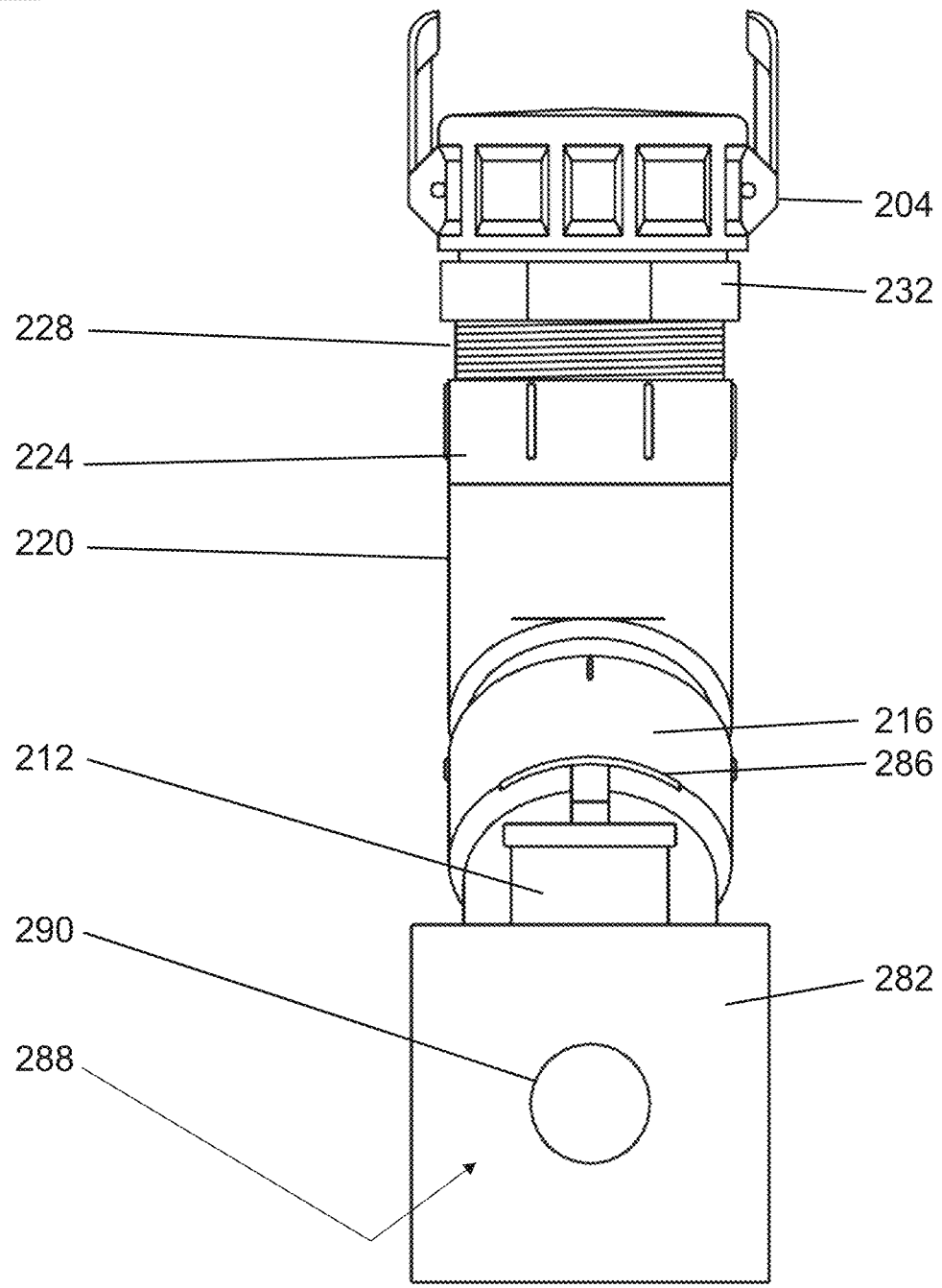
FIG. 3 is a front view of the first injector assembly.

FIG. 3 is a front view of injector assembly 200. Several components introduced during the discussion of FIG. 2 are visible from a different perspective in FIG. 3. Steel plate 282 is shown with the distal face 288 which would be facing the proximal face 112 of ballistic panel 104 (see FIG. 1). The steel plate 282 would be separated from the proximal face 112 of ballistic panel 104 by faceplate 140 which is sized to extend beyond the void 108 in all directions. The injector assembly outlet 290 is aligned with an opening in faceplate 140 to allow injection of a slurry of replacement material into the void 108.

Also visible in FIG. 3 are previously introduced components: cap 204; coupling adapter 232; nipple 228; adapter 224; elbow 220; wye 216; outlet valve 212; and outlet valve handle 286.

While injector assemblies 200 may be made of various sizes, an injector assembly 200 as shown in FIG. 3 may have a total height of approximately twenty inches from the lower end of the steel plate 282 to the top of cap 204.

Figure 4:
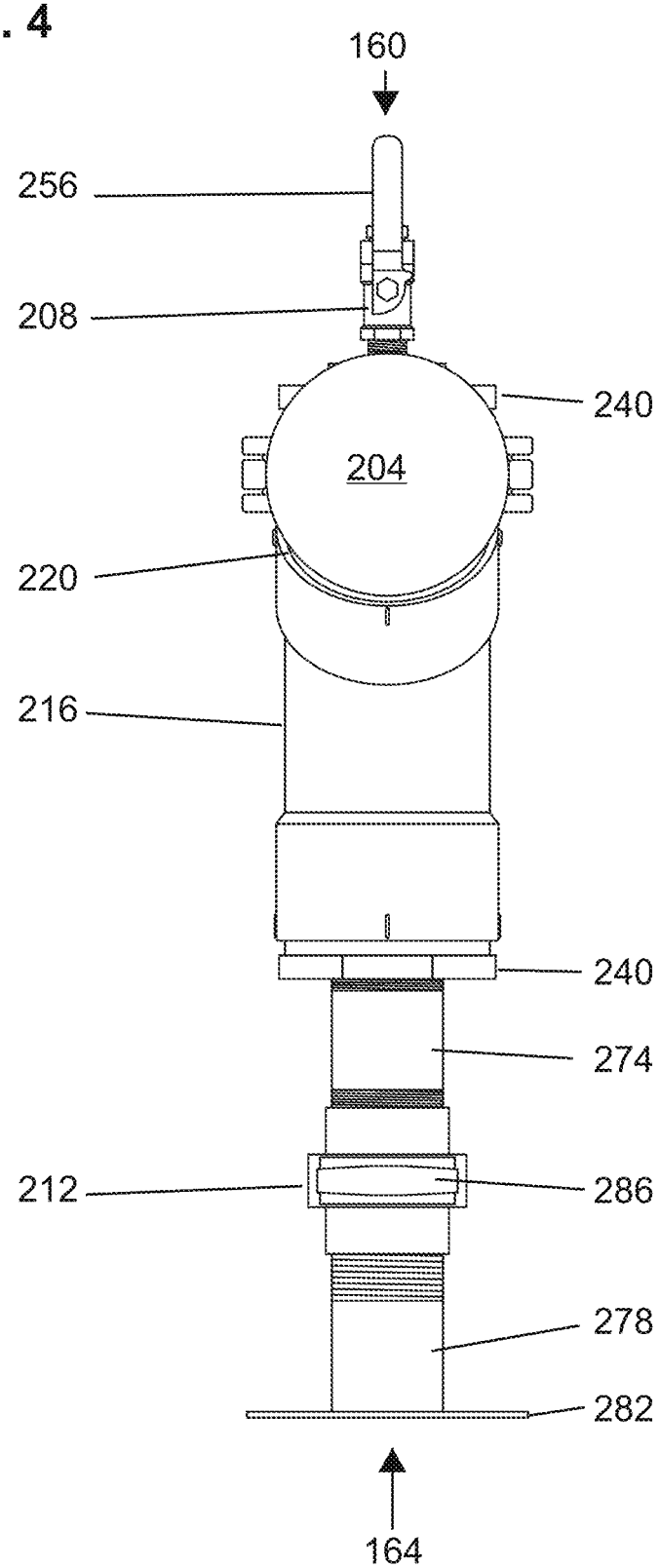
FIG. 4 is a top view of the first injector assembly.

FIG. 4 is a top view of injector assembly 200. This view shows components previously introduced from another view. Moving from the inlet end 160 to the outlet end 164, the visible components are: inlet valve 208 with inlet valve handle 256; reducer bushing 240; cap 204; elbow 220 (barely visible in this view); wye 216; reducer bushing 240; first steel nipple 274; outlet valve 212 with outlet valve handle 286; second steel nipple 278; and steel plate 282.

Sequence of Repair Steps.

Figure 10:
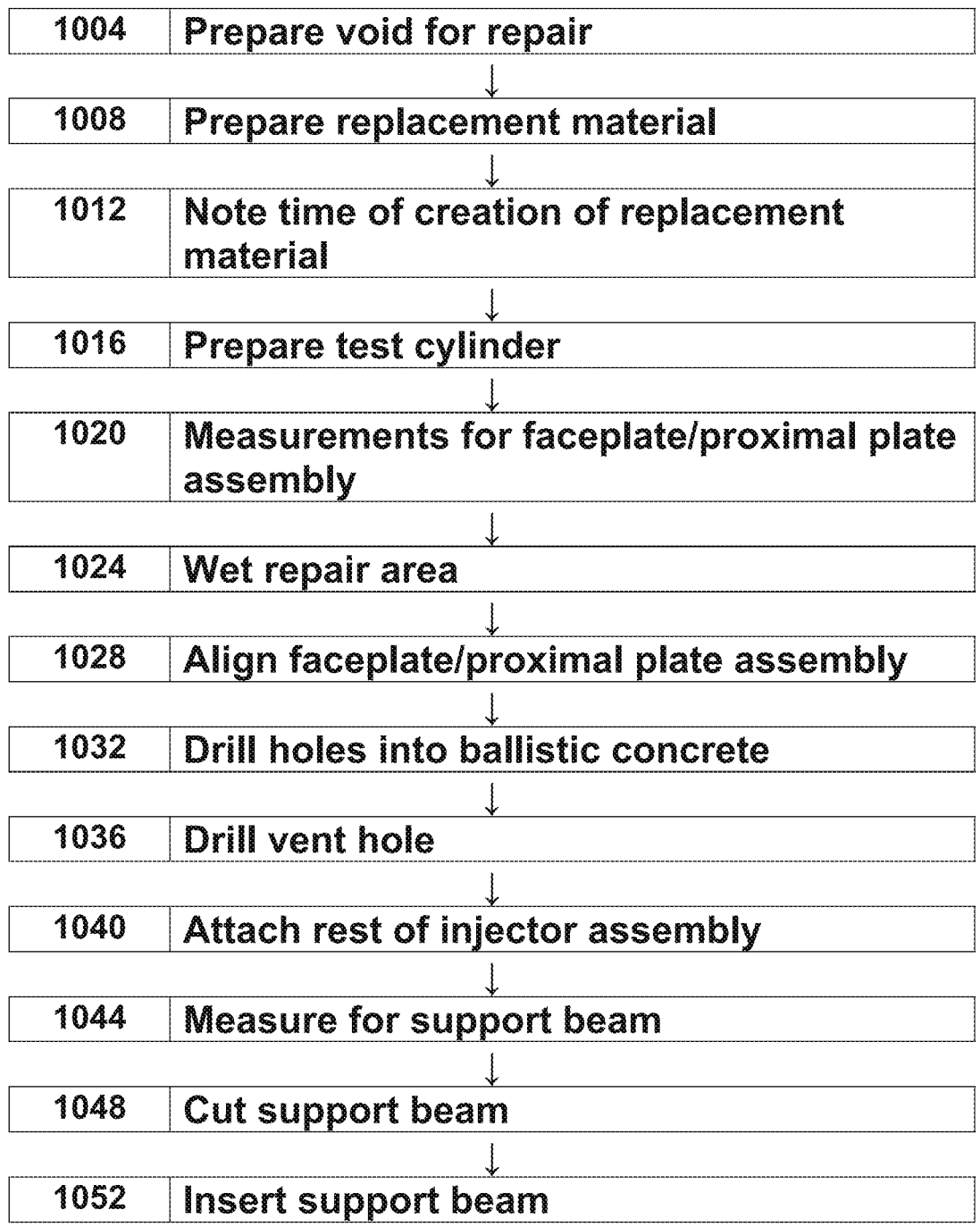
FIG. 10 shows a sequence of steps to prepare to deliver replacement material to repair a void.
Figure 11:
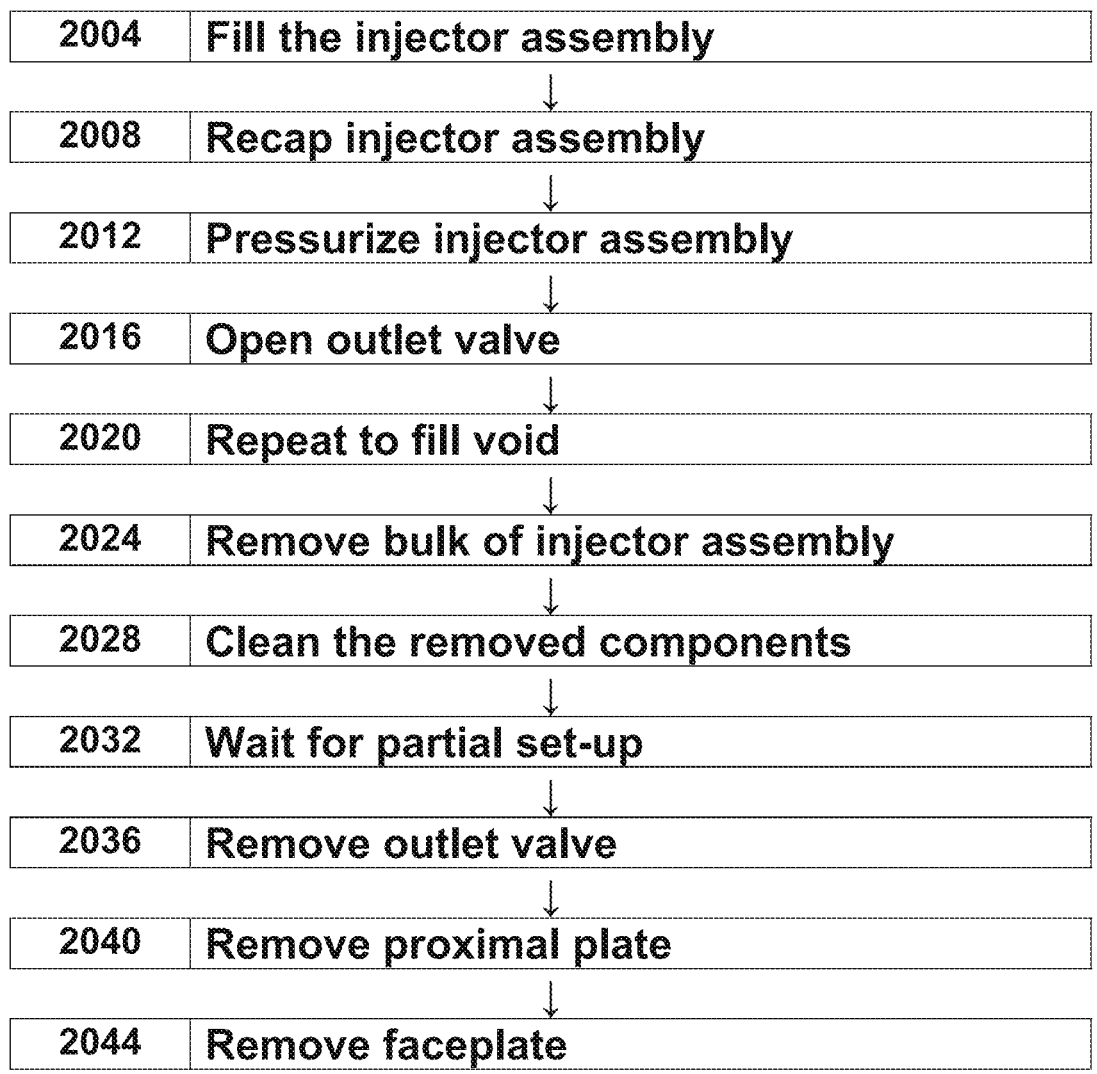
FIG. 11 shows a sequence of steps to fill the void.
Figure 12:
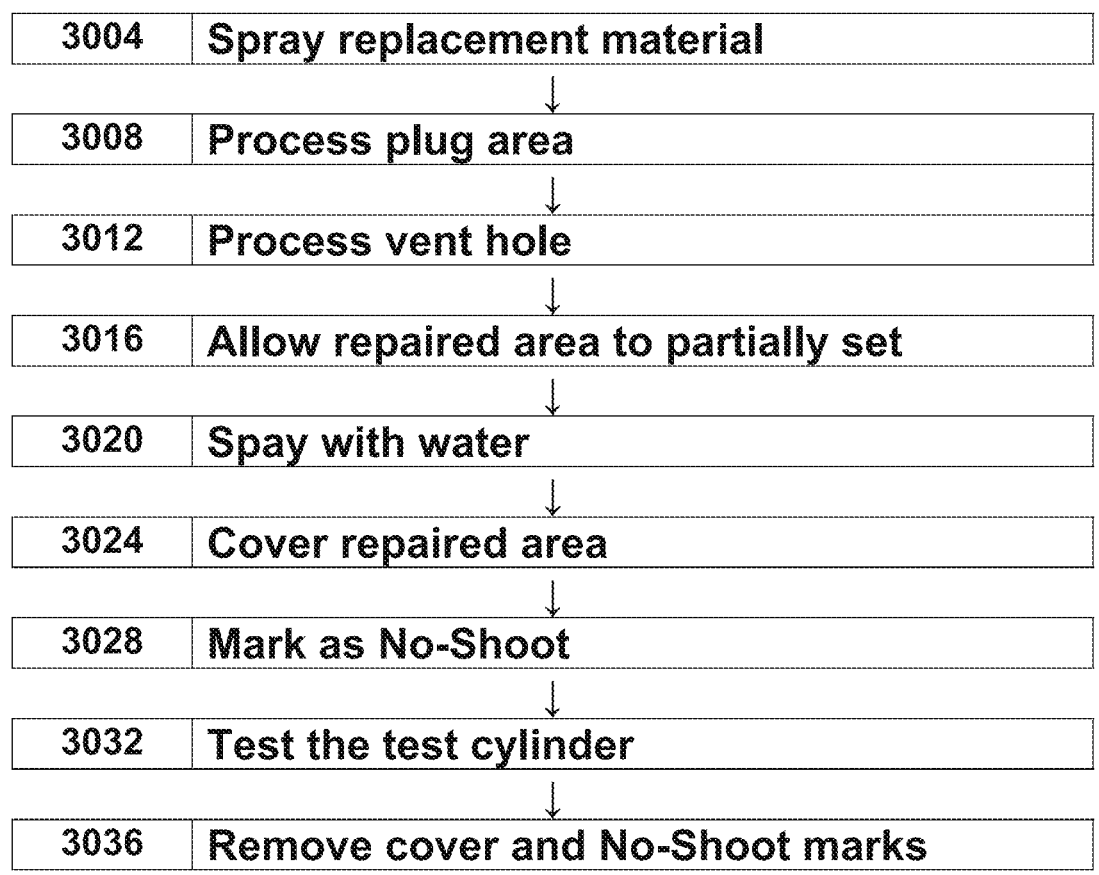
FIG. 12 shows a sequence of steps to process the replacement material after removal of the injector assembly.

FIG. 10 shows a sequence of steps 1000 to prepare to deliver replacement material to repair a void. FIG. 11 shows a sequence of steps 2000 to fill the void. FIG. 12 shows a sequence of steps 3000 to process the replacement material after removal of the injector assembly 200. Those of skill in the art will recognize that some of the steps in these three figures may be done in parallel or the sequence of some steps may be reversed if one step does not require prior completion of another step. The order of the steps presented is not to be deemed as limiting unless the relationship between steps is specified.

Prepare to Deliver Replacement Material.

STEP 1004—Prepare the void 108 for repair. Using rubber gloves (and trowel as appropriate), clean out the void, removing any loose material. Ballistic concrete contains fiber material and there will be fibers extending into the cleaned out void from the ballistic panel. These fibers may be left as is. Fibers remaining in and around the void 108 will help the replacement material to bind to the existing material in the ballistic panel.

STEP 1008—Prepare the replacement material in accordance with manufacturer's instructions. The process for creating suitable replacement material may include periodically stopping the mixing process to weigh a sample such as a quarter cubic foot sample to check if the sample indicates that the replacement material is within a target range for weight per cubic foot. Additional processing may be needed to decrease the weight per cubic foot of the replacement material into a suitable range.

STEP 1012—Once the replacement material is created to manufacturer's specification, note the time, as there may be a need to use the newly made replacement material within a specified time period. For example, the newly created replacement material may need to be used within seventy-five minutes of creation.

STEP 1016—Prepare a Test Cylinder. The test cylinder is used to confirm that the ballistic properties of the replacement material are suitable for the intended use. Ballistic properties include depth of penetration, angle of ricochet, fragmentation, delamination/detachment. The test cylinder should be of an appropriate size for the required test process. Fill test cylinder to the top, and level off using the screed tool. Snap the plastic cover on and write the date and time of mix and the location of the repair on the test cylinder. After the test cylinder passes ballistic testing after adequate curing of the replacement material, the repair is successful. For example, some replacement material may require testing fourteen days after filling the test cylinder.

The precise requirements of the testing process may vary with the intended use of the ballistic panel 104. An example of a ballistic test is testing performed utilizing an M-16 A-2 with a twenty inch barrel or equivalent. The round used is a 5.56 caliber 62 grain green tip round. The round shall be fired from a distance of not greater than 82 feet. Place one round into the center of the cylinder. Measure the depth of the penetration by utilizing a measurement probe. The measured penetration depth should be within the range of one inch to five inches for acceptance. The penetration depth may be measured to the trailing edge of the projectile as measuring to the leading edge of the projectile may not be convenient. A measured penetration depth outside of those parameters means that the replacement material is not suitable for the intended use and the repair should be removed and replaced.

Step 1020—Take measurements to prepare to mount the faceplate/proximal plate assembly. The proximal plate may be the steel plate 282 or another proximal plate such as the aluminum faceplate 1282 discussed below or an analogous plate that connects the outlet of the outlet valve to the opening of the faceplate and the proximal side of the void.

A piece of plywood or other flat surface serves as the faceplate 140 (FIG. 1). The proximal plate such as steel plate 282 and second steel nipple 278 are connected together with the injector assembly outlet 290 of the steel plate 282 aligned with an opening in the faceplate 140. Take measurements of the opening of the void 108 and mark the proximal face 112 of the ballistic panel 104 to help in aligning the injector assembly outlet 290 with the approximate center of the opening of the void 108. The marks need to be sufficiently distant from the opening of the void 108 so that the faceplate 140 may be placed over the void 108 without covering the alignment marks.

Optionally, measure and record the length of the void 108 at the horizontal midline of the void 108 as this measurement may be useful for positioning the vent hole. (discussed below)

Step 1024—Wet the repair area inside and around the void 108 using a spray bottle with water (not shown). There should be no puddling or ponding of water, but the area should be saturated to the point of being thoroughly damp. The purpose of the wetting is to keep the existing ballistic material surrounding the void 108 from quickly drawing water out of the replacement material.

Step 1028—Place the faceplate/proximal plate assembly over the void 108 and align the injector assembly outlet 290 with the approximate center of the opening of the void 108 using the alignment marks.

Step 1032—Using a concrete drill and masonry bit, drill holes through the plywood faceplate 140 into the ballistic concrete around the void 108. These holes are for use with fasteners to hold the faceplate 140 to the proximal face 112 of the ballistic panel 104. A set of six holes may be adequate depending on the size of the faceplate 140. The six holes may be arranged with two holes to the right and to the left of the void and one hole above and below the void. Other patterns may be used. As ballistic concrete differs from conventional concrete, it may be necessary to modify the normal instructions for pilot holes for fasteners. For example, for a fastener used in conventional concrete that normally uses a one quarter inch pilot hole, it may be useful to use a pilot hole made with a three-sixteenth inch drill bit.

Step 1036—Drill the vent hole. Take one half the previously measured length of the void opening and mark a spot above the centerline of the opening in the proximal plate such as second steel nipple 278. Drill a vent hole using a three-quarter inch masonry bit at approximately a forty five degree angle so that the drill bit breaks through the existing ballistic material into the void 108 about halfway towards the back of the void 108. This will provide a vent hole 312 to allow air to leave the void 108 as replacement material is injected into the void 108. While the vent hole 312 shown in FIG. 5 is drilled through the faceplate 140, those of skill in the art will recognized that depending on the size and placement of the faceplate 140, the vent hole 312 could be drilled above the top edge of the faceplate 140. While a single vent hole 312 may be sufficient for many applications, those of skill in the art will recognize that the process may include more than one vent hole, especially for a larger or irregularly shaped void.

Those of skill in the art will recognize that some modification on the starting point and angle of the vent hole may be appropriate for an unusually shaped void.

Alternatively, the vent hole can be placed an inch or so above the top of the proximal plate such as steel plate 282 and the vent hole can be drilled at a horizontal or slight downward angle to intersect with the void. As the operation of the injector assembly is apt to drive replacement material to the back of the void 108, the void 108 will fill from the back to the front. A small gap may occur along the front wall of the void 108 as material may fill the vent hole 312 before the top portion of the front of the void 108 is filled. This small gap can be filled with troweled material during the surface clean up after removing the faceplate 140.

FIG. 5 shows the status after the completion of the preceding step. Visible in FIG. 5 are the plywood faceplate 140 and the steel plate 282 with connected second steel nipple 278. A set of eight fasteners 304 connecting steel plate 282 to faceplate 140 is visible in FIG. 5. The fasteners 304 may be sheetrock screws of appropriate length for the choice of faceplate 140 such as three quarters inch birch plywood. Should a fastener protrude from the distal face of the faceplate 140, the tip of the fastener may be broken off or otherwise removed. Minor surface imperfections caused by the fastener 304 extending beyond the distal face of the faceplate 140 may be corrected at the end when other imperfections are addressed.

Two of the fasteners 308 which hold the faceplate 140 to the proximal face 112 of ballistic panel 104 are visible. Also visible is the proximal opening of the vent hole 312.

Note an analogous view of this step using injector assembly 1200 (discussed below) would show proximal plate 1280 and the holes for connecting the outlet pipe 1278 to the outlet valve 1212.

Step 1040—Screw the rest of the injector assembly to the second steel nipple 278. When done, the cap 204 should be the highest point of the injector assembly 200 so that a slurry of replacement material may be poured into the injector assembly 200 with the cap 204 removed.

Step 1044—Measure for the Support Beam. Measure the distance between the location for the support beam 236 (FIG. 1) on the inlet end 160 of wye 216 and the ground 124.

Step 1048—Cut a Support Beam. Cut a two by four or other suitable board to form a support beam 150 with the length measured in the preceding step. One of skill in the art will recognize that a jack stand or jack may be used in lieu of a support beam.

Step 1052—Insert the support beam 150 to support the inlet end 160 of the injector assembly 200 as the injector assembly 200 will become significantly heavier when filled with replacement material. One of skill in the art will recognize that a small injector assembly 200 that does not weigh an undue amount relative to the stiffness and length of the injector assembly may be operated without a support beam.

Filling the Void.

FIG. 11 shows a sequence of steps 2000 for using a mounted injector assembly 200 to deliver replacement material to a void 108.

Step 2004—Fill the Injector Assembly. Close the inlet valve 208 and outlet valve 212. Remove the cap 204 (via camlock, threaded engagement or whatever is used to remove and replace the cap to hold it against pressure). Use a scoop or other suitable tool to load replacement material into the uncapped injector assembly 200. Depending on the height of the opening to the injector assembly 200, it may be necessary to use a step ladder or other lifting device. The lifting device may be a forklift platform or a scissor lift, or other device to allow access to an injector assembly a distance above the ground.

Step 2008—Recap the Injector Assembly. Use a spray bottle to spray water to remove replacement material from any location that would interfere with closing the cap 204. This is frequently necessary when using a cap that is removed and replaced through treaded engagement.

Step 2012—Pressurize the Injector Assembly. Attach an air hose to male coupler 266 at the inlet end 160 of the injector assembly 200. The air hose should be connected to a source of compressed air such as a portable air compressor (not shown). One of skill in the art will appreciate that an oil-free compressor would be preferred in order to avoid injecting oil into the replacement material. The setting for the air compressor output will be a function of the air injector assembly and may be limited by the type of replacement material used as some replacement material may not tolerate being subjected to high pressures as they may alter the properties of the replacement material and divergence in ballistic properties relative to the replacement material in the test cylinder. A suitable for air compressor setting for an injector assembly made with schedule 80 PVC components is 25 psi (gage pressure). The pressure should be set before turning on the compressor.

As referenced above, the injector assembly may include a pressure regulator which will limit the pressure seen by the inlet valve 208 to a prescribed value such as 25 PSIG. A pressure gage may be placed inline before the inlet valve 208 to allow the operator to ensure that the pressure regulation performed at the air compressor or at the pressure regulator is working to limit the pressure to within a prescribed range or limit. Open the inlet valve 208 to allow air pressure to pressurize the injector assembly 200.

Step 2016—Open the Outlet Valve. Opening of the outlet valve 212 will cause the pressurized replacement material to move to through the outlet valve 212 through the second steel nipple 278 and out the injector assembly outlet 290 on the distal face of the faceplate 140 into the lower pressure of the vented void 108. The void 108 does not become pressurized as the vent hole 312 allows air to leave the void 108. It may be helpful to close the inlet valve 208 to allow the portable air compressor to build up pressure and then open the inlet valve 208 to move more replacement material. Once the replacement material has been substantially removed from the injector assembly 200, there will be a perceptible change in sound or vibration of the injector assembly 200 as compressed air travels through the injector assembly 200.

Step 2020—Repeat Process to Completely Fill the Void. Unless replacement material is seen leaving the upper opening in the vent hole 312, more replacement material is needed. Repeat steps 2004, 2008, 2012, and 2016 until replacement material leaves the upper opening in the vent hole 312. Continue to use a spray bottle to spray water to remove replacement material from any location that would interfere with closing the cap 204.

Step 2024—Remove the Bulk of the Injector Assembly. After replacement material seeps out the top of the vent hole 312, close the inlet valve 208 and then the outlet valve 212. Remove the air compressor hose from the male coupler 266 at the inlet end 260 of the inlet valve 208. Rotate the injector assembly 200 to unthread the outlet valve 212 from the first steel nipple 274 to leave the outlet valve 212 on the second steel nipple 278 that is attached to the steel plate 282 (proximal plate).

Step 2028—Clean the Removed Portion of the Injector Assembly. Clean the injector assembly components thoroughly before the replacement material hardens.

Step 2032—Wait for the Replacement Material in the Void to Partially Set-Up. This may take in the range of 35-40 minutes depending on the weather conditions, the replacement material used, and other factors. The process of setting up can be observed by looking at replacement material present on the inlet side of the outlet valve 212.

Step 2036—Remove the Outlet Valve. Once the replacement material in the outlet valve 212 has set up sufficiently, unthread the outlet valve 212 from the second steel nipple 278. Clean the outlet valve 212 thoroughly.

Step 2040—Remove the Proximal Plate. Remove the fasteners 304 that hold the proximal plate such as steel plate 282 to the faceplate 140. A cross-tip bit may be used depending on the fastener used. After the proximal plate is removed, replacement material will be visible through a corresponding 2 inch diameter hole in the faceplate 140. Once the replacement material visible in the hole in the faceplate 140 is sufficiently set up, then proceed to the next step.

Step 2044—Remove the Faceplate. Once the replacement material is set-up, remove the fasteners 308 holding the faceplate 140 to the proximal face 112 of the ballistic panel 104.

Post-Processing the Replacement Material.

FIG. 12 shows a sequence of steps 3000 to process the replacement material after removal of the injector assembly 200.

Step 3004—Spray the Replacement Material with Water. Spray the replacement material visible with the faceplate 140 removed to keep the area moist so it can be worked.

Step 3008—Process the Plug Area. The process will leave a plug of approximately two inches of diameter that extends from the proximal face 112 of the ballistic panel 104 as this material was extending through the opening in the faceplate 140 and at least partially filling the second steel nipple 278. Knock off the protruding plug and work the surface of the replacement material over the entire surface of the filled void to smooth the surface. Any marks from fasteners 304 that extend beyond the faceplate 140 can be addressed in this step. Sprayed water and troweling additional replacement material may be required.

Step 3012—Process the Vent Hole. Likewise, remove any protruding material from the vent hole 312 and work the area to provide a smooth surface. Any holes from the fasteners 308 in the ballistic panel 104 can be filled with replacement material at this time.

Step 3016—Let the Repaired Area Set. Let the repaired surfaces set for several minutes. Inspect to ensure that the surface of the repaired area has set sufficiently to proceed to the next step.

Step 3020—Spray the Void and Vent Hole with Water. Soak the areas to saturation.

Step 3024—Cover the Repaired Area. Place plastic film over the repaired area and seal with duct tape to hold in the moisture on the repairs. Expect to see condensation on ballistic panel side of the plastic film.

Step 3028—Mark the Area with a No-Shoot Indicator. For example, one might use bright red tape or other warning tape to mark the perimeter of the area to indicate that the repaired area should not be shot and should not be behind a target that is used. A date may be written on the tape along with a unique identifier for the test cylinder in case there are many different repairs and different test cylinders.

Step 3032—Test the Test Cylinder. After the replacement material in the test cylinder has cured sufficiently for testing, test the test cylinder to ensure that replacement material meets the ballistic criteria.

Step 3036—Remove the Plastic and Warning Tape. After the test of the test cylinder confirms that the replacement material meets the ballistic criteria, the plastic film and all tape may be removed and this portion of the ballistic panel may be used without restriction.

Second Example of an Injector Assembly

Figure 6:
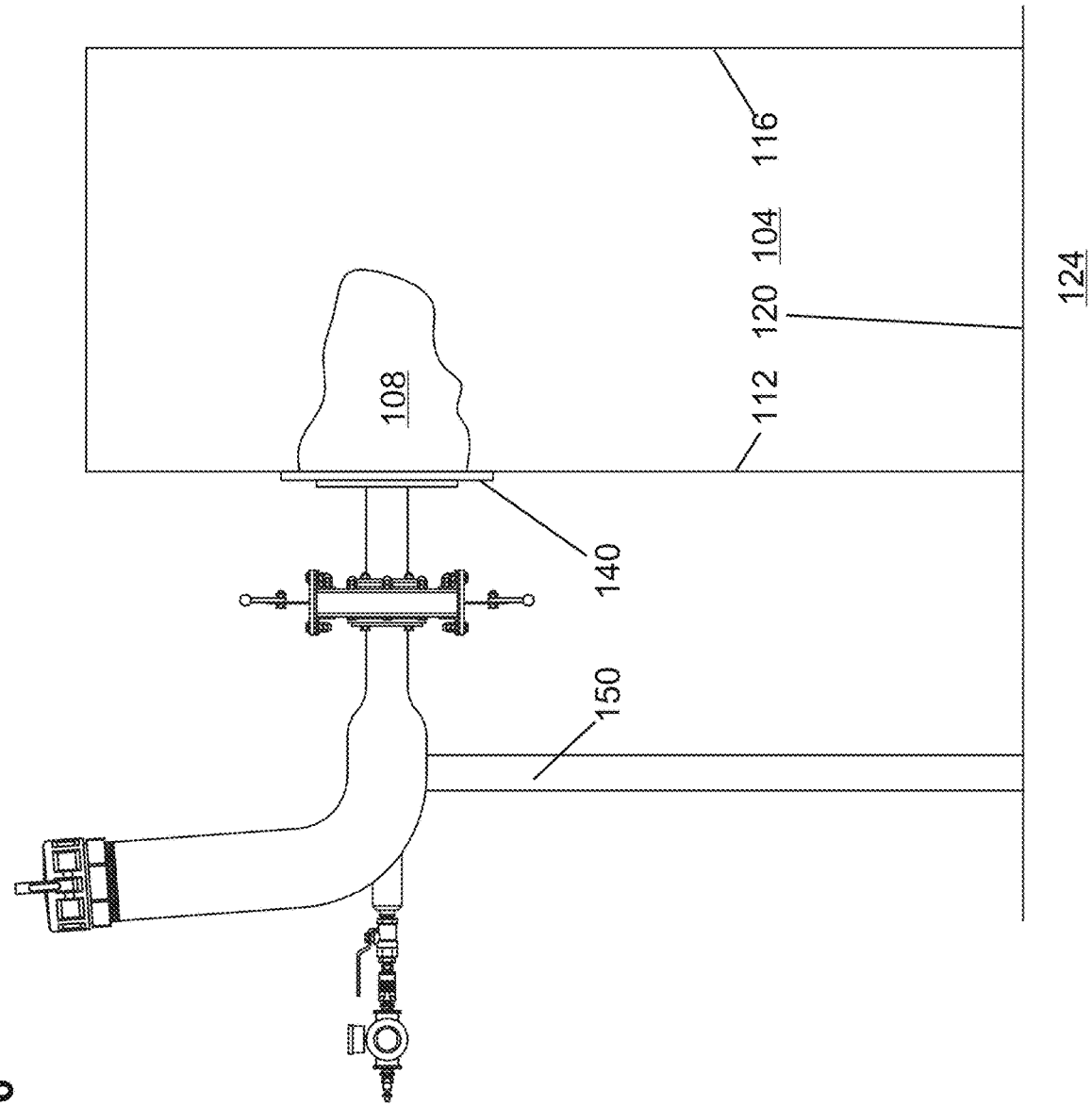
FIG. 6 is a side view of a second injector assembly positioned to fill a void in a ballistic panel.

A second injector assembly 1200 is shown in FIG. 6 which is a side view of an injector assembly 1200 connected to a ballistic panel 104 with a void 108. More specifically, FIG. 6 shows a ballistic panel 104 with a base 120 on the ground 124 or some other support surface. A proximal face 112 of the ballistic panel 104 has a void 108 extending from the proximal face 112 a portion of the distance to the distal face 116. FIG. 6 shows an injector assembly 1200 connected to a faceplate 140 which is removably attached to the proximal face 112 of the ballistic panel 104 by a set of fasteners such as screws 144 (See FIG. 5) such as concrete anchors. The faceplate 140 may be three quarter inch birch plywood. Optionally, a support beam 150 may be cut to the size needed to support the injector assembly 1200 in a substantially horizontal orientation with respect to an opening in the faceplate 140 (discussed below). The support beam 150 helps support the injector assembly 1200 as the injector assembly 1200 will be filled with replacement material (not shown here) loaded into the injector assembly 1200 through an opening on the top end of the injector assembly 1200 that is accessible after removing a cap 1204. Once the injector assembly 1200 is at least partially filled with replacement material and the cap 1204 replaced, air pressure may be used to inject the replacement material into the void through the use of inlet valve 208 and outlet valve 1212. (Valves shown in FIG. 7)

Figure 7:
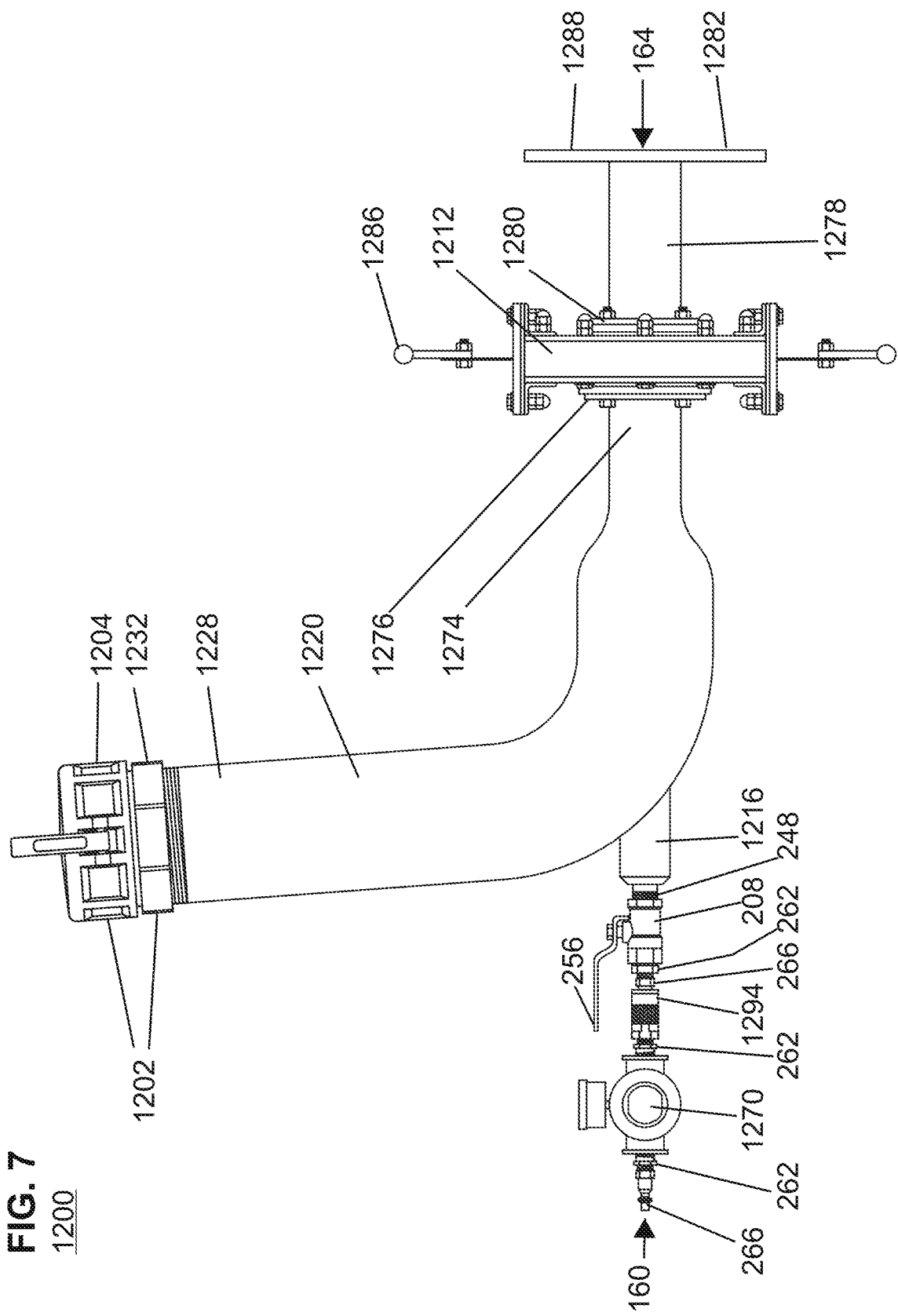
FIG. 7 is a side view of the second injector assembly.

FIG. 7 is a side view of the injector assembly 1200. The majority of the interior volume for receipt of replacement material is found within injector body 1220. The injector assembly 1200 shown in FIG. 7 uses an injector body 1220 that is a manufactured nominal four inch aluminum pipe assembly that reduces to a nominal two inch pipe and has an inlet protrusion 1216. The three ends of the injector body 1220 are: the threaded top 1228; inlet protrusion 1216; and outlet end 1274. Thus, injector body 1220 replaces the wye 216 and elbow 220 from FIG. 2. Injector body 1220 may be made from a material such as schedule 40 aluminum pipe. Those of skill in the art will recognize that other materials can be used based on design choice for pressure used to pressurize the injector assembly 1200, desire to hold down the weight of the injector assembly 1200, desire to have a durable assembly given the abrasive qualities of the replacement materials, and other design criteria.

Both injector assembly 200 and injector assembly 1200 have a cap 204 or 1204 located above a line running between the inlet valve 208 and the outlet valve 212 or 1212. By having the opening in the top of the injector assembly some distance above the valves, the upper portion of the injector assembly serves as a reservoir for replacement material. As indicated in FIG. 7 the teachings of the present disclosure do not require that the upper portion of the injector assembly 1200 be oriented in a pure vertical orientation. Filling the injector assembly 1200 with a quantity of replacement material works well as long as the upper portion has a substantial vertical orientation. In many instances this may be closer to pure vertical than 45 degrees but one could make an injector assembly with an upper portion oriented at 30 degrees or some other angle less than 45 degrees as long as gravity helps deliver replacement material to the portion of the injector assembly 1200 between the inlet valve 208 and the outlet valve 1212.

A cap 1204 such as a four inch aluminum dust cap may be repeatedly removed and replaced via a camlock, threaded engagement, or other design choice suitable for repetitive use in the field and the desire to pressurize the injector assembly 1200. The combination of the cap 1204 and the coupling adapter 1232 may be called the cap assembly 1202.

The outlet end of the injector body 1220 reduces to a two inch nominal diameter. The inlet end 160 of the inlet protrusion 1216 has a one half inch nominal diameter threaded opening which may be engaged by a brass nipple 248. An inlet valve 208 may be threadedly connected to the brass nipple 248. The inlet valve 208 may be a one half inch brass ball valve with inlet valve handle 256. The inlet end 160 of the inlet valve 208 may have a one half inch to one quarter inch brass bushing 262. A one quarter inch male coupler 266 extends from the bushing 262 to connect an air coupler 1294. A one half to one quarter inch bushing 262 connects the inlet end of the air coupler 1294 to a pressure regulator 1270. Another one half to one quarter inch bushing 262 connects the pressure regulator 1270 to a one quarter inch male coupler 266. An air hose from a compressed air source (not shown) may be connected to the one quarter inch male coupler 266 on the inlet end 160 of the injector assembly 1200.

Those of skill in the art will recognize that other components with larger or smaller interior diameters may be used to provide compressed air to the inlet protrusion 1216 without deviating from the teachings of the present disclosure.

Connected to the outlet end 1274 of the injector body 1220 is an outlet valve 1212 with actuator 1286. The outlet end 1274 of the injector body 1220 may have a distal plate 1276 that may be a four inch square plate that is welded to surround the aluminum pipe to allow the outlet end 1274 of the injector body 1220 to be bolted to the inlet end 160 of the outlet valve 1212.

Note that a push-pull actuator with two handles on either side of the outlet valve 1212 may be advantageous for use as the actuator 1286. Placement of the push-pull actuator such that the outlet valve 1212 is closed when the actuator 1286 is in the up position allows downward pressure against the pressurized replacement material which may be the more difficult change in valve position to be done with the least risk of dislodging the injector assembly from the support beam 150. Horizontal orientation for the push-pull actuator may be implemented if additional caution is used to avoid pushing the injector assembly 1200 off the support beam 150. An injector assembly/support beam interaction that would keep the injector assembly 1200 supported even after some horizontal movement of the inlet end 160 of the injector assembly 1200 may be acceptable. For a smaller injector assembly that is not supported by a support beam, the outlet valve 1212 may be oriented so that the actuator 1286 is down when the valve is closed so that the force to move the actuator is not added to the weight of the filled injector assembly 1200 when the actuator 1286 is moved to open the pressurized injector assembly 1200.

Those of skill in the art will recognize that there are a number of different valve designs that are used with fluids but will also recognize that some valve designs are more prone to fouling from the sand and grit in the replacement material, so certain valve choices will be more reliable and durable than other choices. Many of the viable choices will be types of gate valves such as knife valve, slide valve (sometimes called guillotine valve), or wedge valve.

Connected to the outlet end 164 of the outlet valve 1212 is the outlet pipe 1278 which may be a two inch schedule 40 aluminum pipe welded to an aluminum faceplate 1282. The outlet pipe 1278 has a proximal plate 1280 that may be a four inch square plate that is welded to surround the aluminum pipe to allow the outlet pipe 1278 to be bolted to the outlet end 164 of the outlet valve 1212.

While injector assemblies 1200 may be made of various sizes, an injector assembly 1200 as shown in FIG. 7 may have a total length of approximately three feet from the from the distal face 1288 of aluminum faceplate 1282 to the inlet end 160 of the male coupler 266 on the inlet end 160 of the pressure regulator 1270. The length may be longer if an optional pressure gage was included between the pressure regulator 1270 and the inlet valve 208.

Figure 8:
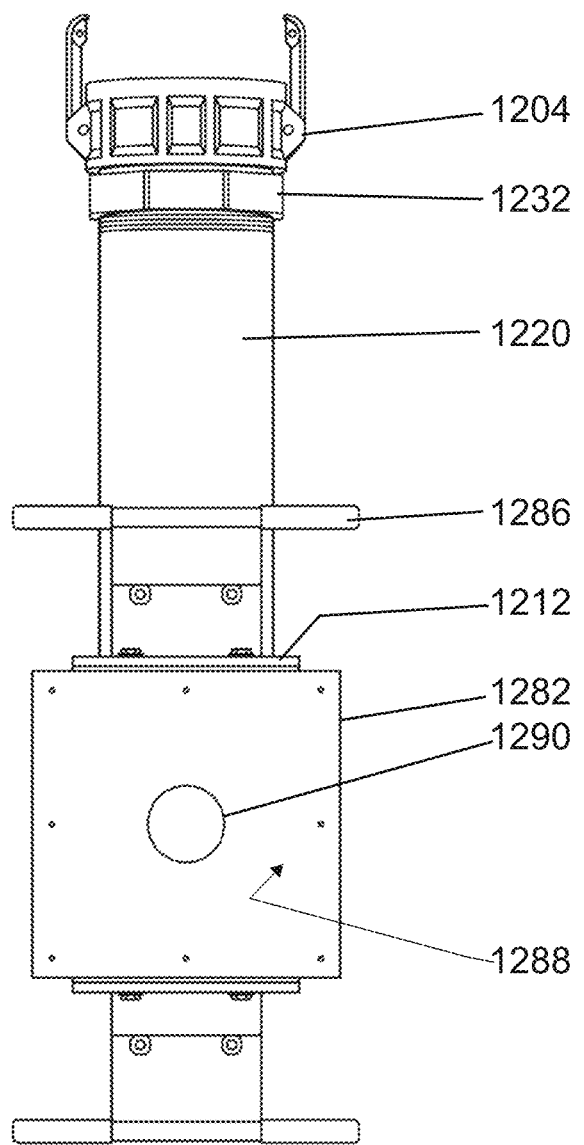
FIG. 8 is a front view of the second injector assembly.

FIG. 8 is a front view of injector assembly 1200. Several components introduced during the discussion of FIG. 7 are visible from a different perspective in FIG. 8. Aluminum faceplate 1282 is shown with the distal face 1288 which would be facing the proximal face 112 of ballistic panel 104 (see FIG. 6). The aluminum faceplate 1282 would be separated from the proximal face 112 of ballistic panel 104 by the faceplate 140 which is sized to extend beyond the void 108 in all directions. The injector assembly outlet 1290 is aligned with an opening in faceplate 140 to allow injection of a slurry of replacement material into the void 108.

Also visible in FIG. 8 are previously introduced components: cap 1204, coupling adapter 1232; injector body 1220, outlet valve 1212; and actuator 1286.

While injector assemblies may be made of various sizes, an injector assembly 1200 as shown in FIG. 8 may have a total height of approximately twenty inches from the lower actuator 1286 to the top of the cap 1204 (excluding the camlock).

Figure 9:
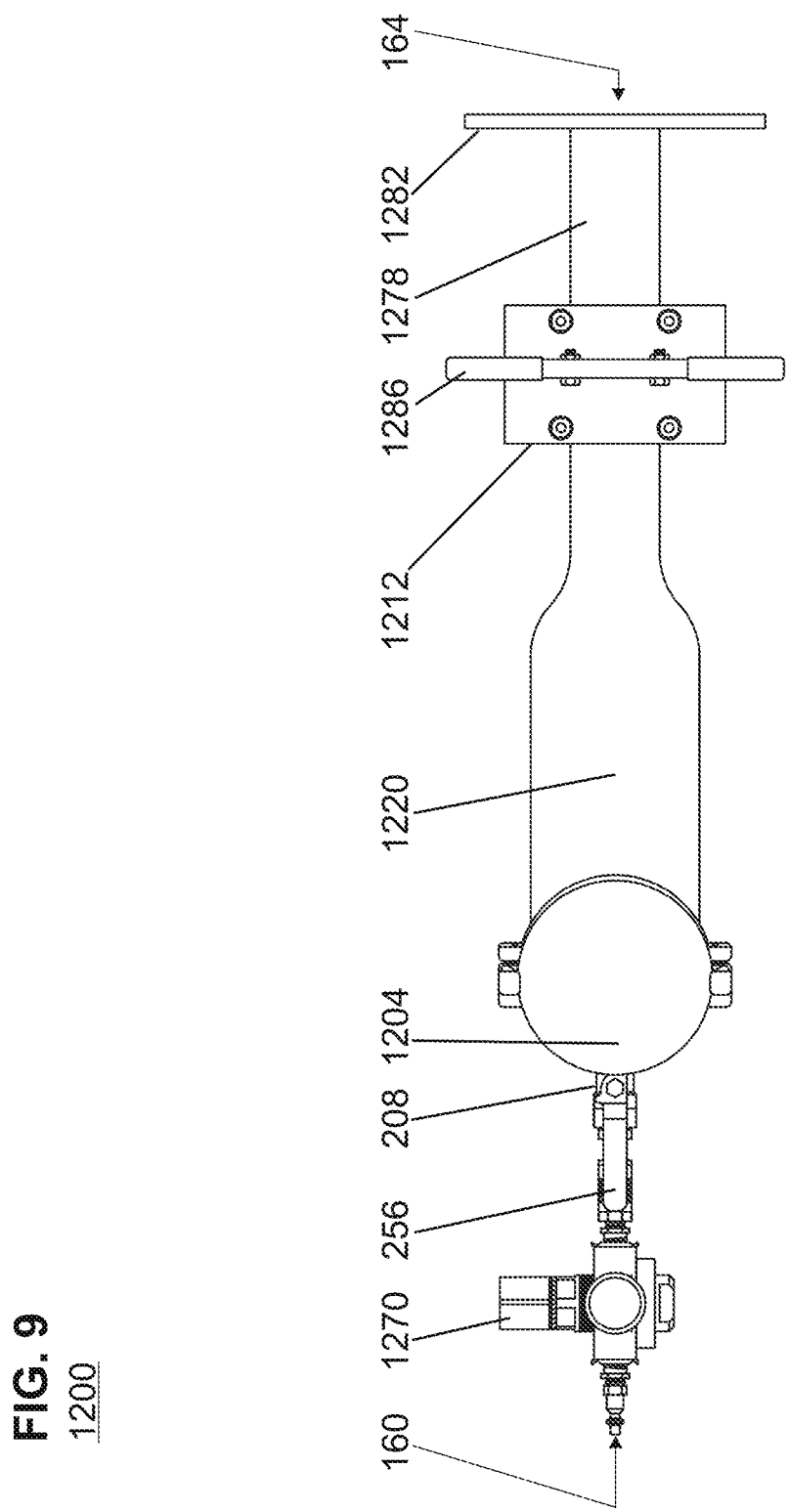
FIG. 9 is a top view of the second injector assembly.

FIG. 9 is a top view of injector assembly 1200. This view shows components previously introduced from other views. Moving from the inlet end 160 to the outlet end 164 the major visible components are: pressure regulator 1270, inlet valve 208 with inlet valve handle 256; cap 1204 with camlocks, injector body 1220, outlet valve 1212 with actuator 1286, outlet pipe 1278 with aluminum faceplate 1282.

Alternatives and Variations.

Alternative Materials.

While examples provided above have named materials that may be used for specific components such as aluminum, steel, plywood, brass, and PVC, those of skill in the art will recognize that other materials may be substituted. The decision to change material may impact the weight of the injector assembly or the cost of the injector assembly but those of skill in the art will understand those impacts and make decisions based on particular needs.

Scaling.

The overall volume of replacement material that is loaded into a injector assembly 200 or 1200 before being driven into the void 108 may be varied by altering the diameters and lengths of components between the outlet of the inlet valve 208 and the inlet out the outlet valve (212 or 1212). Changes to increase the volume will increase the weight of an empty injector assembly and the weight of a filled injector assembly but will decrease the need for many cycles of loading with replacement material to fill a large void 108.

Omission of Pressurization of Injector Assembly.

One of skill in the art will recognize that for certain uses of an injector assembly, it may be sufficient to fill the injector assembly with replacement material and open the outlet valve before opening the inlet valve so that there is not an intermediate act of pressurizing the injector assembly before opening the outlet valve. Such a deviation from the process set forth in this disclosure should be viewed as an alternative covered by the scope of this disclosure.

Use of Pressurized Gas other than Air.

While compressed air is a well-known item for use in construction sites including remote sites as air compressors are made with a variety of fuel options and tanks of compressed air are easy to carry to a remote site, the process does not require that the compressed gas be air. Other gases can be used providing that they are compatible with the replacement material (won't alter the replacement material) and safe for use around those performing the procedure.

Alignment of Inlet and Outlet.

While the examples of injector assemblies 200 and 1200 show an inlet approximately horizontal with the outlet, this is not a requirement. One of skill in the art will appreciate that a pressurized gas inlet could be placed out of horizontal alignment with the outlet. For example, an injector assembly inlet could be placed above the outlet. The inlet could even be placed above the removable cap.

If the inlet to the injector assembly was placed relatively high relative to the outlet valve, one could potentially forego the inlet valve 208 and simply use a valve at the source of the compressed gas (such as a tank of compressed gas) or the controls for a compressor to turn on and off the provision of compressed gas through a pressure regulator.

Ballistic Material

The present invention includes a ballistic concrete as described in U.S. Pat. No. 9,121,675, issued Sep. 1, 2015 To Amidon et al., and incorporated herein by reference in its entirety.

The following definitions regarding the ballistic material are provided for the benefit of the reader and are not limitations.

The term "fine aggregate" means natural sand (including quartz, chert, igneous rock and shell fragments), limestone (calcium carbonate), manufactured sand (crushed stone, recycled concrete, slag) ranging from mesh size #8 to #200 (2.4 mm to 0.07 mm) In preferred, non-limiting embodiments the fine aggregate is masonry sand (ASTM C 144) or general concrete sand (ASTM C 33) meeting the size criteria. In one non-limiting embodiment the fine aggregate is saturated surface dry (SSD) material, see ASTM C 128.

The term "fiber" means concrete additives to reinforce the concrete with may be steel, alkali-resistant glass strands, or synthetic polymers. In preferred, non-limiting embodiments the fiber is a polyolefin, a polyester, a polyamide, (e.g., Kevlar®, nylon, polyester, polyethylene, polypropylene) or a mixture thereof, which may be a monofilament, fibrillated, or structured fibers (macrofibers). In one embodiment, the fibers meet ASTM C 1116 standards, such as ASTM C 1116 Type III requirements for polypropylene or ASTM C 1116 Type I for steel. Non-limiting examples include Grace Fibers™ (W. R. Grace & Co., Cambridge, Mass.); Nylon—N6600, Polyester—PE7, Polypropylene—CFP 1000, Polypropylene—PP7 (Concrete Fibers Inc., Dallas, Tex.); Nycon-MM, NYCON-PVA, Nycon-RECS100, Nycon-RF4000, Nycon-RSC15, Nycon-XL (Nycon Corp., Fairless Hills, Pa.); ENDURO® 600, Fibercast® 500 for Precast, Fibercast® 510, Fibermesh® 150, Fibermesh® 300, Fibermesh® 650, Novocon® 1050, Novocon® XR, Novomesh® 850, Novomesh® 950 (Propex Concrete Systems Corp., Chattanooga, Tenn.); PSI Fibers™ (PSI Packaging, LaFayette, Ga.). Additional examples of suitable fibers include fibers described in U.S. Pat. No. 5,456,752 (Hogan); U.S. Pat. No. 6,423,134 (Trottier et al.); U.S. Pat. No. 6,582,511 (Velpari); or U.S. Pat. No. 6,758,897 (Rieder et al.), the contents of which are hereby incorporated by reference in their entirety.

The term "air entrainment additive" means admixtures that are part of the ballistic concrete mix to incorporate air bubbles of controlled sizes in the ballistic concrete matrix. These admixtures stabilize the air bubbles entrained during the mechanical mixing of ballistic concrete by the mixer blades. Examples of air entrainment additives include, but are not limited to, DaraFill® Dry or wet DaraFill formulations (W. R. Grace & Co.), Rheocell® Rheofill™ (BASF Construction Chemicals, Cleveland, Ohio), Micro Air® (BASF Construction Chemicals), EUCON EASY FILL (Euclid Chemical Co., Cleveland, Ohio), Fritz-Pak Fill Flow (Fritz-Pak, Dallas, Tex.). Additional examples of air entrainment additives may be found in U.S. Pat. No. 4,488,910 (Nicholson et al.); U.S. Pat. No. 4,737,193 (Gutmann et al.); U.S. Pat. No. 4,249,948 (Okada et al.); U.S. Pat. No. 4,046,582 (Kawamura et al.); or the Portland Cement Association publication entitled "Manual on Control of Air Content in Concrete" (PCA EB 116), the contents of which are hereby incorporated by reference in their entirety.

Air Entrainment Additives

Air entrainment additives generally include a surfactant. The surfactant can be rosin-based or non-rosin-based. Other air-entraining materials, such as perlite, can also be used. The composition of some common air entraining additives follow:

Darafill—fatty alkanolamide 60% w/w, diethanolamine 4% w/w, perlite 60% w/w, quartz (crystalline silica) 0.50% w/w.

Rheocell Rheofill—Sulfonic acids, C14-16-alkane hydroxy and C14-16-alkene, sodium salts 75-100%; Benzenesulfonic acid, dimethyl-, sodium salt 5.0-15.0%.

Micro Air (hazardous ingredients only)—Alpha-olefin sulfonate 1-5% w/w; potassium hydroxide 1-5% w/w, rosin 0-1.0% w/w.

Eucon Easy Fill—Sodium (C14-16) Olefin Sulfonate 125-50% w/w

The term "depth of penetration" with respect to a bullet penetration into a barrier is measured by inserting a measuring implement into the hole formed by the bullet and measuring from the point of entry to the trailing end of the bullet. Thus, the maximum penetration is actually a bit deeper than the measured penetration as the bullet, while altered in shape from the impact has a non-zero length. The depth of penetration of bullets into the absorbing material may be measured using alternative methods known to those skilled in the art. Laser based tools such as a laser range finder may also be used.

Preparations of Bullet Absorbing Component

In a non-limiting formulation, the bullet absorbing components are prepared by mixing cement, fine aggregate, and water to form a grout. The grout may be obtained from a ready mix concrete supplier.

Next an air entrainment additive is mixed into the grout. Then calcium phosphate, aluminum hydroxide and fiber are added. After mixing for a number of minutes the density is checked. As noted below, the addition of the calcium phosphate and aluminum hydroxide may be omitted if preventing lead leaching is not a concern.

If the mixture is above the target density range, additional mixing adds additional entrained air bubbles to reduce the density. The process of measuring density and providing additional mixing is repeated until the measured density is within a target range of the optimal density.

When the density is deemed appropriate, the ballistic concrete is pumped into the void to fill it. Typically, the ballistic concrete is allowed to harden and cure for at least 4 weeks. Batching, mixing, transporting, testing, curing and placing the ballistic concrete would preferably meet the standards described in the Army Corp. of Engineers guidelines "Technical Specification for Shock Absorbing Concrete (SACON®)":

American Concrete Institute (ACI) Standards
ACI 117 (1990) Standard Specifications for Tolerances for Concrete Construction and Materials
ACI 301 (1999) Standard Specification for Structural Concrete
ACI 304R (2000) Guide for Measuring, Mixing, Transporting, and Placing Concrete
ACI 305R (1999) Hot Weather Concreting
ACI 306R (1997) Cold Weather Concreting
ACI 544.1R (1996) State-of-the-Art Report in Fiber Reinforced Concrete
ACI 544.2R (1999) Measurement of Properties of Fiber Reinforced Concrete
American Society for Testing and Materials
ASTM C 33 (2001) Standard Specification for Concrete Aggregate
ASTM C 39 (2001) Standard Test Method for Compressive Strength of Cylindrical Concrete Specimens
ASTM C 94 (2000) Standard Specifications for Ready-Mixed Concrete
ASTM C 138 (2001) Standard Test Method for Density (Unit Weight), Yield, and Air Content (Gravimetric) of Concrete
ASTM C 144 (2002) Standard Specification for Aggregate for Masonry Mortar
ASTM C 150 (2002) Standard Specification for Portland Cement
ASTM C 171 (1997) Standard Specification for Sheet Materials for Curing Concrete
ASTM C 172 (1999) Standard Practice for Sampling Freshly Mixed Concrete
ASTM C 567 (2000) Standard Test Method for Unit Weight of Structural Lightweight Concrete
ASTM C 1116 (2002) Standard Specification for Fiber-reinforced Concrete and Shotcrete
Us Army Corps of Engineers Handbook for Concrete and Cement (CRD)
CRD-C 400 (1963) Requirements for Water for Use in Mixing or Curing Concrete
National Ready-Mixed Concrete Association (NRMCA)
NRMCA QC 3 (January 1990; 9th Rev) Quality Control Manual: Section 3, Plant Certifications Checklist: Certification of Ready-Mixed Concrete Production Facilities
NRMCA CPMB 100 (January 1990; 9th Rev) Concrete Plant Standards
NRMCA TMMB 1 (1989; 13th Rev) Truck Mixer and Agitator Standards The Portland cement used would preferably be ASTM C 150 Type I-II. The fine aggregate may be masonry sand (ASTM C 144), or general concrete sand (ASTM C 33).

The calcium phosphate may be granulated bone meal, bone ash, or precipitated calcium phosphate. In one non-limiting embodiment, it is technical grade or higher. The aluminum phosphate may be metakaolinite or precipitated aluminum hydroxide. In one non-limiting embodiment, it is technical grade or higher. Color pigments may be optionally added to create the appearance rocks, trees, buildings, etc. Suppliers of concrete pigments include Scofield Co. (Douglasville, Ga.) or Lambert Corp. (Orlando, Fla.). Thus, the present disclosure teaches the option of pigmented bullet absorbing components.

The present disclosure teaches the creation of components made from wet ballistic concrete prepared without an addition of preformed foam.

One of skill in the art of ballistic concrete manufacturing would recognize that these materials are prepared on industrial scale and accordingly quantities and proportions may vary in accordance with industry norms. In addition, one skilled in ballistic concrete manufacturing would recognize that materials may be measured by volume or by timed delivery from a storage container.

The following examples further illustrate the various teachings of the disclosure and are not intended to limit the scope of the claimed invention.

The bullet absorbing structural component made with ballistic concrete comprises:
(a) about 1 part by mass Portland cement;
(b) about 0.5 to 1.5 part by mass fine aggregate;
(c) about 0.005 to 0.15 part by mass fiber;
(d) about 0.005 to 0.05 part by mass calcium phosphate;
(e) about 0.005 to 0.05 part by mass aluminum hydroxide; and
(f) about 0.0005 to 0.05 part by mass air entrainment additive, such that the bullet absorbing component is capable of passing the penetration test described above.

In one non-limiting embodiment, the bullet absorbing component comprises
(a) about 0.8 to 1.2 part by mass fine aggregate;
(b) about 0.008 to 0.012 part by mass fiber;
(c) about 0.008 to 0.012 part by mass calcium phosphate;
(d) about 0.008 to 0.012 part by mass aluminum hydroxide; and
(e) about 0.0008 to 0.002 part by mass air entrainment additive.

In another non-limiting embodiment, the bullet absorbing component comprises
(a) about 0.9 to 1.1 part by mass fine aggregate;
(b) about 0.009 to 0.011 part by mass fiber;
(c) about 0.009 to 0.011 part by mass calcium phosphate;
(d) about 0.009 to 0.011 part by mass aluminum hydroxide; and
(e) about 0.0009 to 0.0015 part by mass air entrainment additive.

The mixture comprising the Portland cement, the fine aggregate, the fiber; the calcium phosphate, the aluminum hydroxide, and the air entrainment additive may be mixed until the mixture has a density within a range of 88 to 94 pounds per cubic foot. The teachings of the present disclosure may be used to create a ballistic concrete without the use of the calcium phosphate and aluminum hydroxide if lead-leaching control is not an objective.

In one non-limiting embodiment, the fiber may be a polyolefin fiber, which may or may not be fibrillated. In another embodiment the air entrainment additive is Dara-Fill® Dry.

The bullet absorbing component may have air bubbles resulting from the air entrainment additive that are less than about 0.04 inches (1 mm) in diameter. Alternatively, the bullet absorbing component may have air bubbles resulting from the air entrainment additive that are greater than 0.0004 inches (10 microns) in diameter. In another non-limiting embodiment, the bullet absorbing component has air bubbles resulting from the air entrainment additive that are less than about 0.04 inches (1 mm) in diameter and greater than 0.0004 inches (10 microns) in diameter.

The training with the live ammunition may be performed with at least one of the following types of weapons:
.22 caliber weapon, .38 caliber weapon, .40 caliber weapon, .45 caliber weapon, 5.56 mm weapon, 6.8 mm weapon, 7.62 mm weapon, 9 mm weapon or a grenade or other fragmentation device.

Preparation of Components for Use Live Fire Ammunition

The ingredients for making the ballistic concrete components are as follows:

Amount per unit ballistic concrete in Ingredient English System Metric System Portland Cement 972 pounds (441 kilograms); Fine Aggregate (SSD) 972 pounds (441 kilograms); Water 466 pounds (211 kilograms); Calcium Phosphate 9.72 pounds (4.41 kilograms); Aluminum Hydroxide 9.72 pounds (4.41 kilograms); DaraFill® Dry 11.4 ounces (323 grams); Grace Fibers™ 14.8 pounds (6.71 kilograms).

Figure 13:
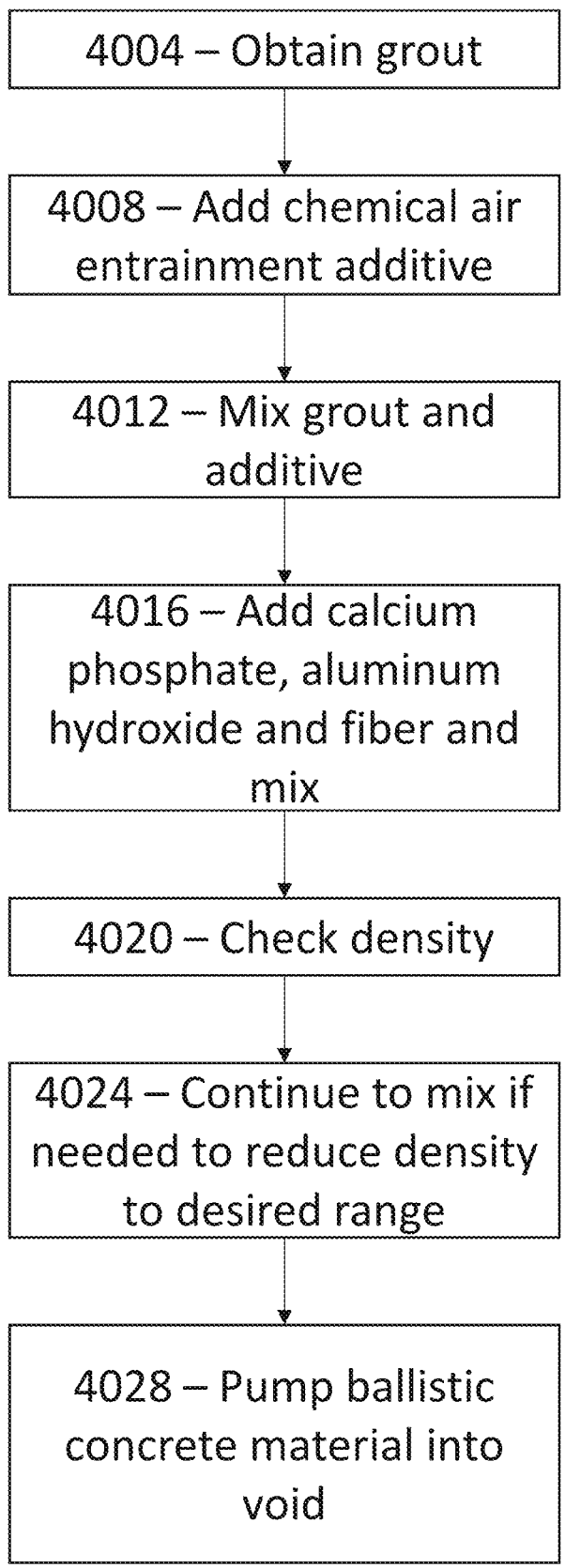
FIG. 13 summarizes the process for making ballistic concrete made with chemical air entrainment additive rather than foam.

FIG. 13 summarizes a process 4000 for making bullet absorbing components. As noted below, some of the steps may be performed in slightly different orders but for sake of clarity, it is useful to introduce one sequence of steps for discussion rather than muddy the water with premature digressions on alternatives. The steps may be summarized as follows:

Step 4004—Obtain a grout of Portland cement, fine aggregate, and water in a mixer in accordance with ACI standard 304R and/or ASTM standard C 94. The act of obtaining includes creating the grout or obtaining the grout from some third party.

Step 4008—Add a chemical air entrainment additive (DaraFill® Dry, W. R. Grace & Co.).

Step 4012—Following the addition of the additive, mix the grout for five minutes. Mixing may be achieved by rotating the drum on a cement mixer truck.

Step 4016—Add Calcium Phosphate, Aluminum Hydroxide, and fiber. One suitable fiber is Grace Fibers™. Mix for an additional ten minutes.

Step 4020—Check density such as by weighing using a ¼ cubic foot testing pot. Target weight is 22.7 pounds (approximately 91 pounds per cubic foot) as the actual target is 91 pounds per cubic foot.+−.3 pounds per cubic foot.

Step 4024—Continue to mix if needed to reduce density to desired range. Additional mixing lowers the density. Continue to mix, checking frequently, until target density is achieved. The target wet density material when poured into components is 1458 kg/m.sup.3 (91-pounds per cubic foot+3 pounds per cubic foot).

Step 4028—Pump ballistic concrete material into void. As with traditional SACON® type ballistic concrete, vibration such as may be used with standard structural concrete is to be avoided to minimize destruction of air bubbles.

Changes in Order and Additives.

Note that the step of adding the calcium phosphate and aluminum hydroxide could be done at the same time as adding the chemical air entrainment additive.

Note further, that as the calcium phosphate and aluminum hydroxide are added to reduce lead-leaching from ballistic concrete blocks which have absorbed ammunition with lead components; these chemicals are not central to the ballistic properties of the ballistic concrete. Thus, in applications where the need to reduce lead-leaching is not important (whether because of local rules, post use disposal plans, or a movement to ammunition with minimal or no lead), one can make ballistic concrete in accordance with the teachings of the present disclosure without addition of calcium phosphate or aluminum hydroxide.

The fiber may be added at the same time as the chemical air entrainment additive (and possibly the calcium phosphate and aluminum hydroxide) as this process does not require achieving a pre-fiber density before adding the fiber. When the process is modified so that there is not a need to add material after five minutes of mixing, simply mix for fifteen minutes before checking density. Additional mixing may be required to reduce density.

Less Restrictions on Pouring.

Unlike traditional SACON® type ballistic material with fragile foam bubbles, ballistic material made in accordance with the teachings of the present disclosure is not limited to a 2 foot maximum drop during pouring or a 2 foot maximum depth of a pour. Thus, unlike traditional SACON® type ballistic material, ballistic material made in accordance with the teachings of the present disclosure may be poured into wall panels oriented in their final vertical orientation. Optionally, ballistic material made in accordance with the teachings of the present disclosure may be poured into voids with pour heights well in excess of 2 feet tall. Pours of greater than 3 feet in height are obtainable. Pours of greater than 6 feet in height are obtainable. Pours of greater than eight feet in height from bottom to top of a void are obtainable. Pour structures of full height walls of eight feet or more may be done.

The component is wrapped in plastic to assure adequate hydration during curing. One of skill in the art will recognize that the timing of these steps may be adjusted based on weather conditions, particularly temperature but also factoring humidity. The components are allowed to harden and dry and are ready for use and/or testing after 28 days.

One of skill in the art will recognize that the fibers enhance the strength and resilience of the components and ability of the repaired components to withstand a bullet entry without spalling. Spalls are flakes of material that are broken off a larger solid body such as the result of projectile impact, weathering, or other causes. It is desired that the repaired components retain their structural integrity with the exception of the trail formed by the bullet entry. Thus while the fibers are important, one of skill in the art can identify and substitute other fibers that are suitable for the task, see e.g., paragraph defining term fiber in definitions section above. The choice of fibers will impact the overall density of the wet material as the weight of the fibers impact the density calculation.

Benefits of the Improved Bullet Absorbing Components

To date, the improved bullet absorbing components have consistently performed well in ballistic testing. Anecdotal evidence suggests significantly higher failure rates for traditional SACON® ballistic concrete than with the improved production process. These failure rates may be due to a lack of consistency of the product using traditional SACON® ballistic concrete. The improved production process produces a very consistent material with an extremely low (much less than 1%) failure rate of the penetration test listed above.

Other benefits for the improved ballistic concrete are the predictable and uniform results in ballistic performance when the mix falls within the target density range. By uniform results, it is meant that penetration tests on different parts of a panel made with the improved ballistic panel will all pass the penetration test.

The process is sufficiently predictable that when a sample falls outside of the target range for density after the prescribed mixing period, this aberrant result is a strong indicator that the sand used in the mix is out of specifications, perhaps because of inclusion of clay or another contaminant.

Modification for Slower Projectiles

Those of skill in the art, recognize that the muzzle velocities for different types of ammunition differs a considerable amount. For example, within pistols, the muzzle velocity of a 9 mm handgun is significantly higher than the muzzle velocity of a 45 caliber pistol. The muzzle velocity for a given type of ammunition will actually depend on part on the length of the barrel of the gun.

In order to design a ballistic barrier for a lower velocity projectile than used in the standard penetration test described above, the ballistic barrier must be made easier to penetrate so that the back end of the projectile penetrates more than one inch into the ballistic barrier. Increasing the amount of chemical air entrainment additive and or increasing the mix time to downwardly adjust the density target for the ballistic material will enable the ballistic panel to be tuned for use with a particular lower velocity projectile. Density of the ballistic concrete may be dropped by simply mixing longer without changing the amount of air entrainment additive. May need to augment with additional air entrainment additive for a severe change in density.

Modifications for Other Bullet Depth Ranges.

One of skill in the art could modify the teachings of the present disclosure to tune the ballistic concrete to capture a bullet from a prescribed round, firearm, and firing distance within a depth range that is different from the 1 to 5 inch range referenced above. Thus, a ballistic concrete component could be tuned to capture bullets in a depth range of 2 to 6 inches of depth as measured to the part of the bullet closest to the entry point, or 0.5 inches to 3 inches of depth as measure to the part of the bullet closest to the entry point.

Thus, in an example embodiment, a ballistic panel is formed with the ballistic material herein described, the panel including a filled void, wherein the filled void is filled with a ballistic replacement material; and the filled void exhibits ballistic properties equivalent to the original ballistic panel formed with the ballistic material.

The repaired ballistic panel has a uniform density of between about 1121 kg/cubic meter (about 70 pounds per cubic foot) and about 1442 kg/cubic meter (about 90 pounds per cubic foot). The ballistic replacement material does not delaminate from adherence to the ballistic panel.

The ballistic panel with ballistic replacement material is shatter-resistant when struck with a bullet of between about 4 mm (.172 caliber) with muzzle velocity about 120 m/s (390 ft/s) and about 12.7 mm weighing 600-800 grains (40-50 g) (50 caliber) with muzzle velocity of 2800-3100 feet/sec (850-950 m/s) and kinetic energy of 12,000-15,000 foot-pounds (17-21 kJ).

Retrofit of Existing Structures

In one embodiment, the present invention provides a method of retrofitting a preexisting wall for bullet resistance comprising the steps of: acquiring ballistic paver blocks; selecting a preexisting wall to be augmented; selecting a side of the preexisting wall to be augmented; applying a row of the ballistic paver blocks in the first layer; applying subsequent rows of the ballistic paver blocks in the first layer; applying subsequent layers of the ballistic paver blocks.

In another embodiment, the present invention provides a bullet resistant wall comprising: ballistic paver blocks; wherein the ballistic paver blocks are arranged so as to create a wall with multiple layers; wherein the multiple layers are formed through multiple rows of the ballistic paver blocks.

In yet another embodiment, the present invention provides a bullet resistant wall comprising: ballistic paver blocks; wherein the bullet resistant wall does not contain any metal shielding or metal mesh.

The creation of stand-alone bullet resistant walls utilizing ballistic concrete wall panels twenty-four to thirty inches thick for use in a live-fire training facility is well known in the art. These large structures are appropriate as the walls need to withstand repeated exposure to live fire while retaining an adequate ability to stop bullets from getting from one side of the ballistic concrete panel to the other. However, such massive components require heavy equipment to move and take up a large amount of space. Large concrete wall panels would not be a convenient or practical solution for hardening a school or office building against penetration from a limited number of bullets.

In contrast, traditional building construction using steel stud frames or concrete masonry units (cinder blocks) will not stop a NATO M80 round (7.62 NATO) and the revised round known as the Enhanced Performance Round (EPR) can penetrate concrete masonry unit walls from forty to eighty meters depending on the rifle used. Filling a cinderblock wall with mortar may add to the stability of the wall, but mortar does not have stopping power for bullets or other projectiles. Additionally, solid filling the cinderblock walls with concrete would be expensive and require deconstruction of sections of wall. Thus, most buildings are vulnerable to bullets. In light of highly publicized attacks upon schools with a shooter armed with an assault rifle, there is an unmet need to be able to harden preexisting walls in buildings.

Referring now to the drawings in general, the illustrations are for the purpose of describing a preferred embodiment of the invention and are not intended to limit the invention thereto.

Figure 14:
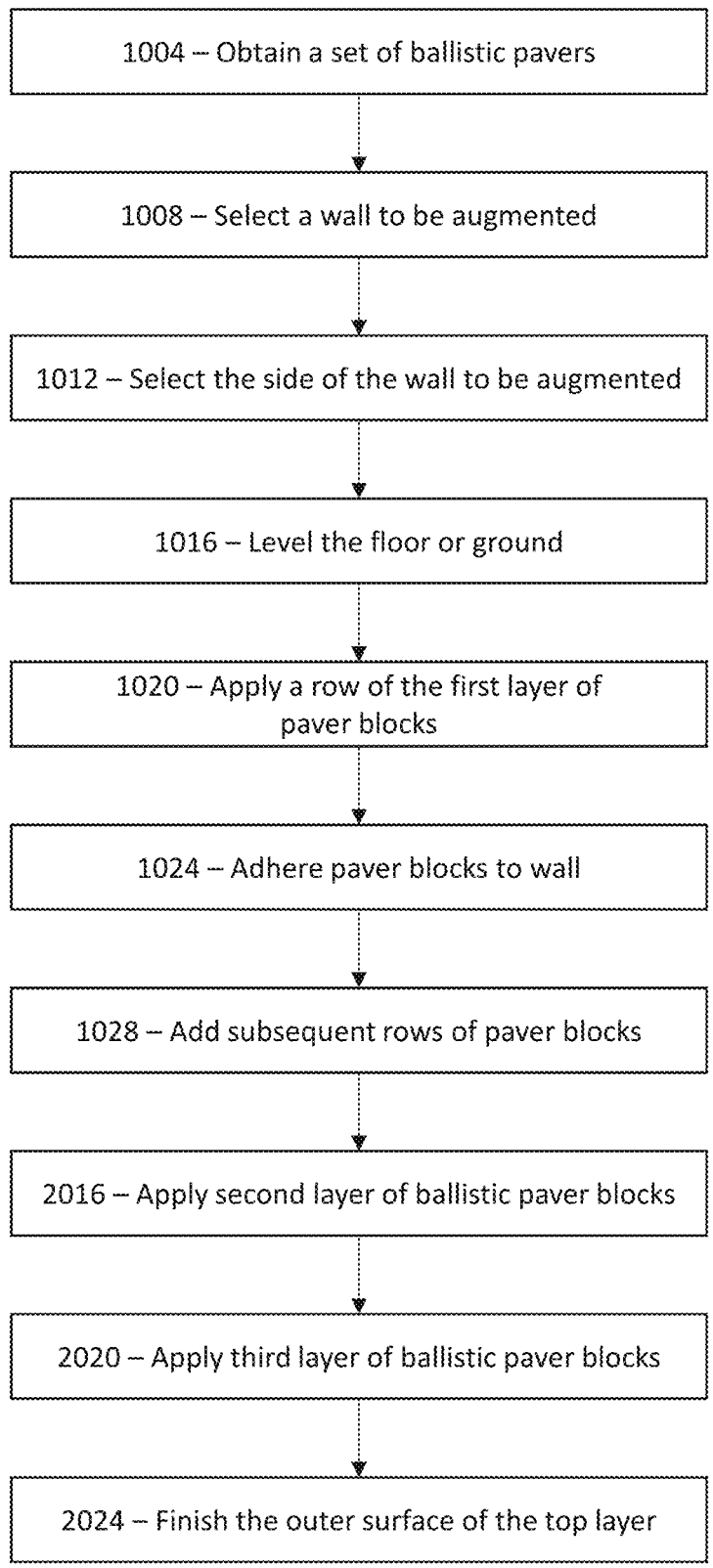
FIG. 14 illustrates a sequence of steps associated with retrofitting a preexisting wall to provide bullet resistance, according to one embodiment of the present invention.

FIG. 14 shows a sequence of steps 1000 to incorporate bullet resistance into a preexisting wall according to one embodiment of the present invention.

STEP 1004—Obtain a set of ballistic paver blocks for use in the project. In one embodiment of the present invention, the dimension of the ballistic paver blocks is 12 inches by 12 inches by 3 inches. In an alternative embodiment, the ballistic paver blocks have a surface face of between 144 and 324 square inches. In an alternative embodiment, the ballistic paver blocks have a surface face of between 16 and 64 square inches. In an alternative embodiment, the ballistic paver blocks have a surface face of between 64 and 144 square inches. In one embodiment of the present invention, the ballistic paver blocks are square. Alternatively the ballistic paver blocks are rectangular. In a preferred embodiment of the present invention the ballistic paver blocks will be as large as is convenient for the application. Using larger paver blocks means fewer blocks to move and adhere to the wall. Additionally, larger ballistic paver blocks create fewer seams and are desirable because a bullet that happens to hit a seam may penetrate through the seam more easily than penetrating through a non-seam section of the ballistic paver block.

In a preferred embodiment of the present invention, the ballistic paver blocks are made using ballistic concrete in accordance with the process set forth in U.S. Pat. No. 9,121,675, issued Sep. 1, 2015, which is hereby incorporated by reference in its entirety. Alternatively, the ballistic paver blocks are made with SACON® ballistic concrete prepared following the specifications set forth in the "Technical Specification for Shock Absorbing Concrete (SACON®)—Shock Absorbing Concrete for Constructing Live-Fire Training Facilities" and described in U.S. Pat. No. 6,264,735 issued Jul. 24, 2001, and U.S. Pat. No. 6,620,236 issued Sep. 16, 2003, which are hereby incorporated by reference in their entirety. Alternatively, the ballistic paver blocks are made with ballistic concrete prepared in some other manner where the ballistic concrete is used to allow bullets to be captured rather than ricochet off of the ballistic paver block when striking the paver block substantially perpendicularly.

Step 1008—Select a preexisting wall to be augmented. In one embodiment of the present invention the preexisting wall is an interior wall. Alternatively the preexisting wall is an exterior wall. In one embodiment of the present invention the preexisting wall is made from conventional steel studs with drywall. Alternatively the preexisting wall can be made of concrete masonry units (CMUs—sometimes called cinder blocks). Alternatively the preexisting wall is made using any other conventional building technique.

Step 1012—Select the side of the preexisting wall to be augmented. In one embodiment of the present invention the preexisting wall is an exterior wall. When determining which side of the wall is to be augmented, many factors are considered. By way of example and not limitation, factors include the need to maintain interior square footage. In another embodiment of the present invention the ballistic paver blocks are placed against the face of the preexisting wall anticipated to be closer to the shooter. Alternatively, the ballistic paver blocks are placed against the face of the preexisting wall anticipated to be farther away from the shooter.

Step 1016—Level the floor or ground in the region that will receive ballistic paver blocks. This is an optional step as some buildings have walls that are flat and level by the edge of the wall to be enhanced. By way of example and not limitation, a user may snap a line to mark what is level, then shim or use some other methods known to those skilled in the art to get a level base for the ballistic paver blocks.

Figure 15:
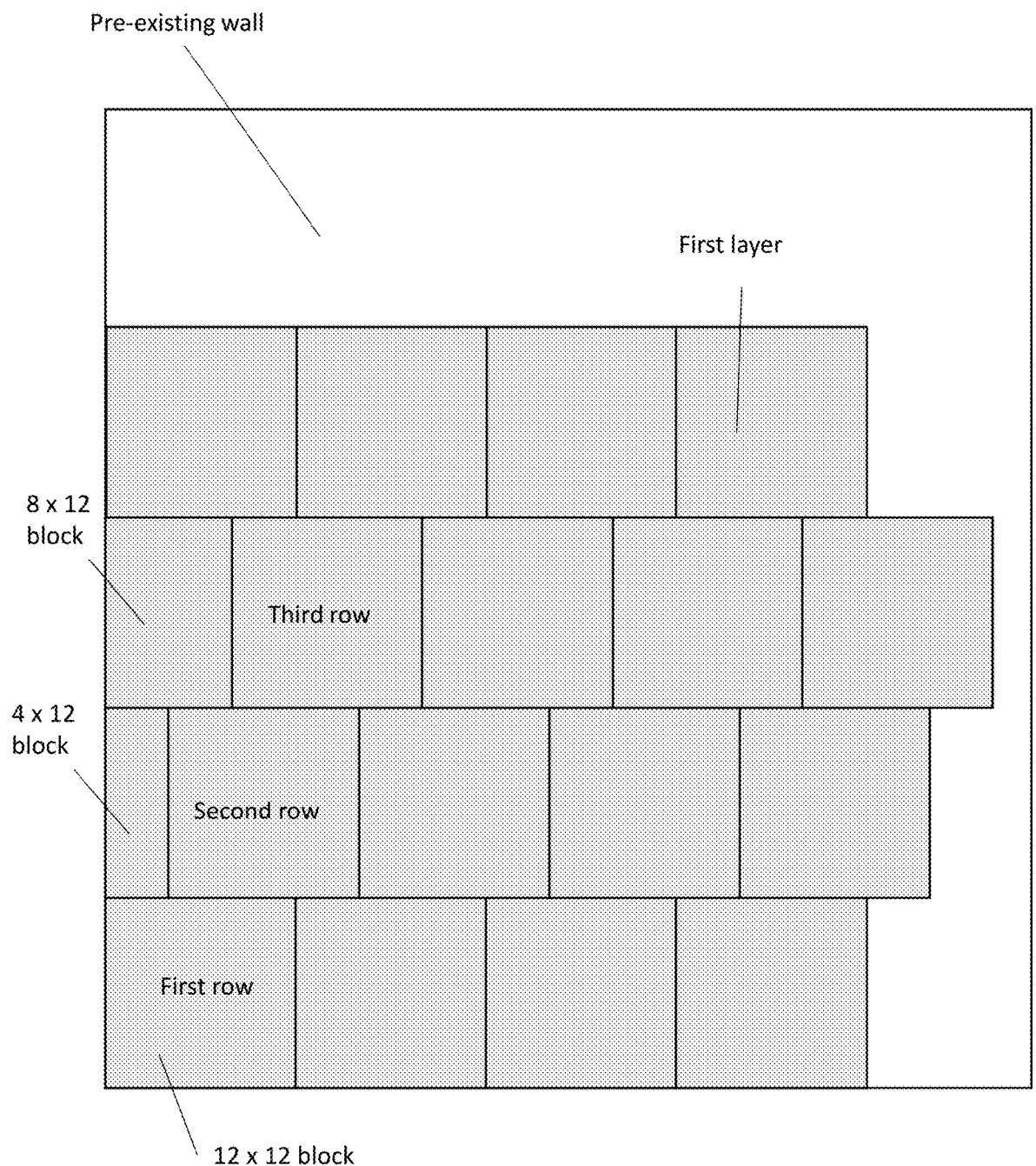
FIG. 15 illustrates a front view of a wall with a first layer of ballistic paver blocks according to one embodiment of the present invention.

Step 1020—Apply a row of the first layer of ballistic paver blocks. FIG. 15 illustrates a front view of a wall with a first layer of ballistic paver blocks according to one embodiment of the present invention. In one embodiment of the present invention the ballistic paver blocks are 12 inches square and 3 inches thick. Alternatively the ballistic paver blocks can be in a different dimensional configuration depending on requirements of the final product and the limitations associated with the work space. In one embodiment of the present invention the row is premeasured so that custom ballistic paver blocks fit flush against the abutting wall. In another embodiment of the present invention the wall is built with standard sized ballistic paver blocks and the last ballistic paver block before the end of the wall is cut with a saw. The ballistic paver blocks are readily field cut with a tile saw or other saw used to cut analogous material.

For a wall that is to be protected that will abut another wall to be protected in an inside corner, run the first row of the first layer of the first wall to be protected to the corner. Run the first row of the first layer of the second wall to be protected until making contact with the first wall.

In a preferred embodiment of the present invention, the seams between adjacent ballistic paver blocks do not need to be filled with traditional mortar as the flat edges of the ballistic paver blocks will fit together. This is advantageous as traditional mortar does not have bullet resistance characteristics, and thereby eliminating mortar reduces the surface of the wall that is not resistant to bullets. Additionally, any gaps in the seams for one layer of ballistic paver blocks will be covered by subsequent offset layers of ballistic paver blocks, thereby ensuring sufficient bullet resistance across the entire augmented wall face. In another embodiment the gaps between ballistic paver blocks is filled in with traditional mortar. This can be advantageous to modify ballistic paver block spacing, thereby ensuring subsequent ballistic paver block layers are offset from previous ballistic paver block layers.

Step 1024—Adhere the ballistic paver block to the wall using a mastic such as a landscaping mastic used for attaching stone or masonry elements in hardscaping. In one embodiment of the present invention the ballistic paver blocks are adhered to the preexisting wall using a construction mastic. In another embodiment the ballistic paver blocks are adhered to the preexisting wall using an alternative adhesive appropriate for the work environment. By way of example and not limitation, a taller wall consisting of ballistic paver blocks requires a stronger adhesive to ensure the stability of the augmented wall and safety of those in its proximity. Those of skill in the art will be able to select an appropriate construction adhesive for use with the present disclosure.

In one embodiment of the present invention the adhesive is placed only on the singular face of each individual ballistic paver block that contacts the preexisting wall or previous layers of ballistic paver blocks. In this configuration the adhesive is used to ensure the ballistic paver blocks do not slip away from the wall. The combined weight of the ballistic paver blocks is transferred down to the floor and therefore no adhesive on the bottom of the ballistic paver blocks is required. In another embodiment of the present invention, where the shape of the augmented wall warrants it, adhesive can be applied to every side of the ballistic paver blocks.

Figure 16:
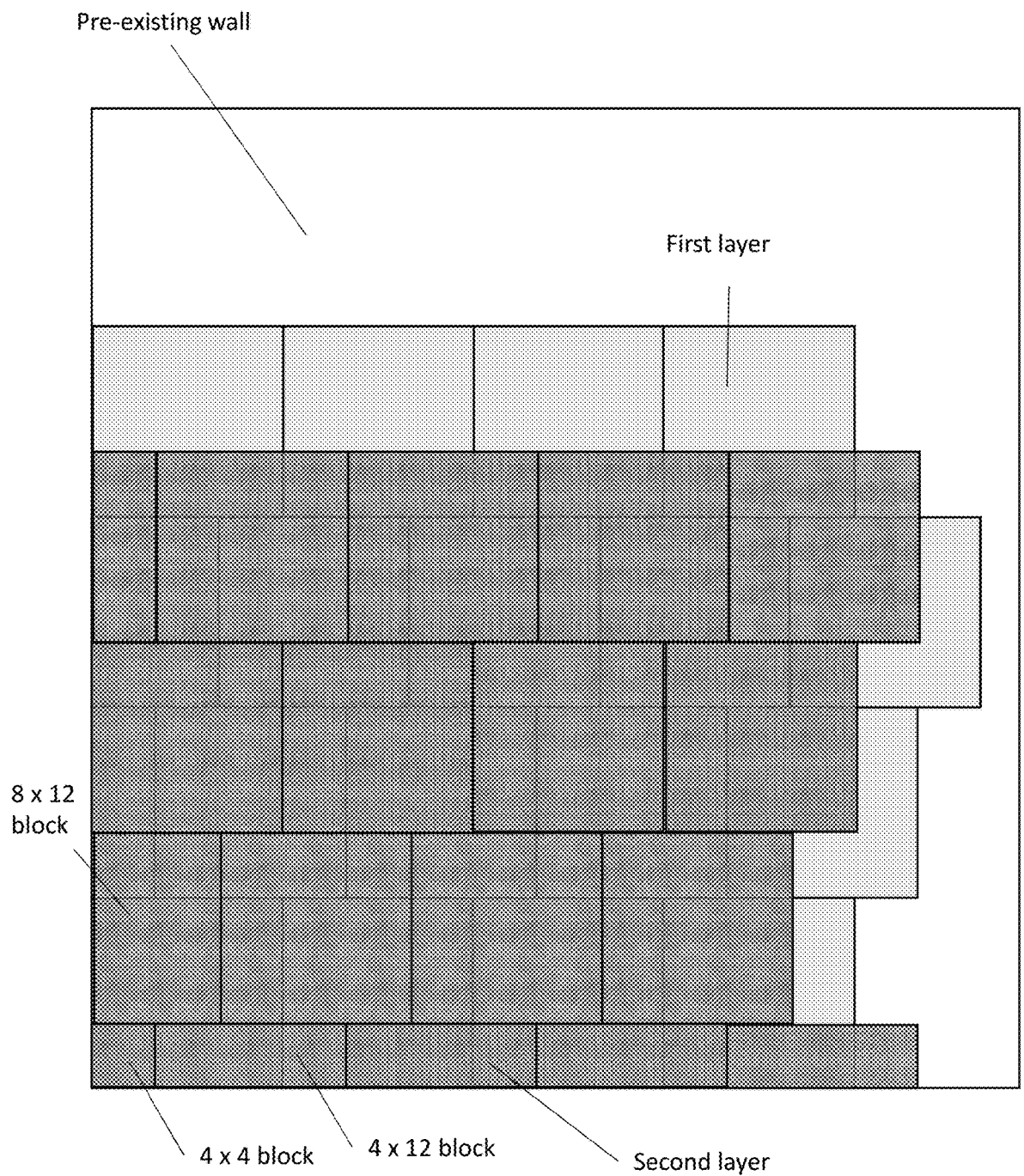
FIG. 16 illustrates a front view of a wall with a first and second layer of ballistic paver blocks according to one embodiment of the present invention.

Step 1028—Add the subsequent rows to the first row of the first layer of ballistic paver blocks. In a preferred embodiment each row of ballistic paver blocks is offset from the row below (closer to the floor). By way of example and not limitation, the first row starts with a 12 inch wide ballistic paver block, the second row starts with a 4 inch wide ballistic paver block, and the third row starts with an 8 inch ballistic paver block, as illustrated in FIG. 16. The pattern then repeats until the top of the preexisting wall. Alternatively, the offset is 2 inches. Alternatively the offset is 3 inches. Alternatively the offset is 5 inches. Alternatively the offset is the width of the ballistic paver blocks divided by the number of layers in the augmented wall. In a preferred embodiment of the present invention, the magnitude of the offset from one row to the next is utilized in every layer of the augmented wall, thereby preventing overlapping seams.

Figure 17:
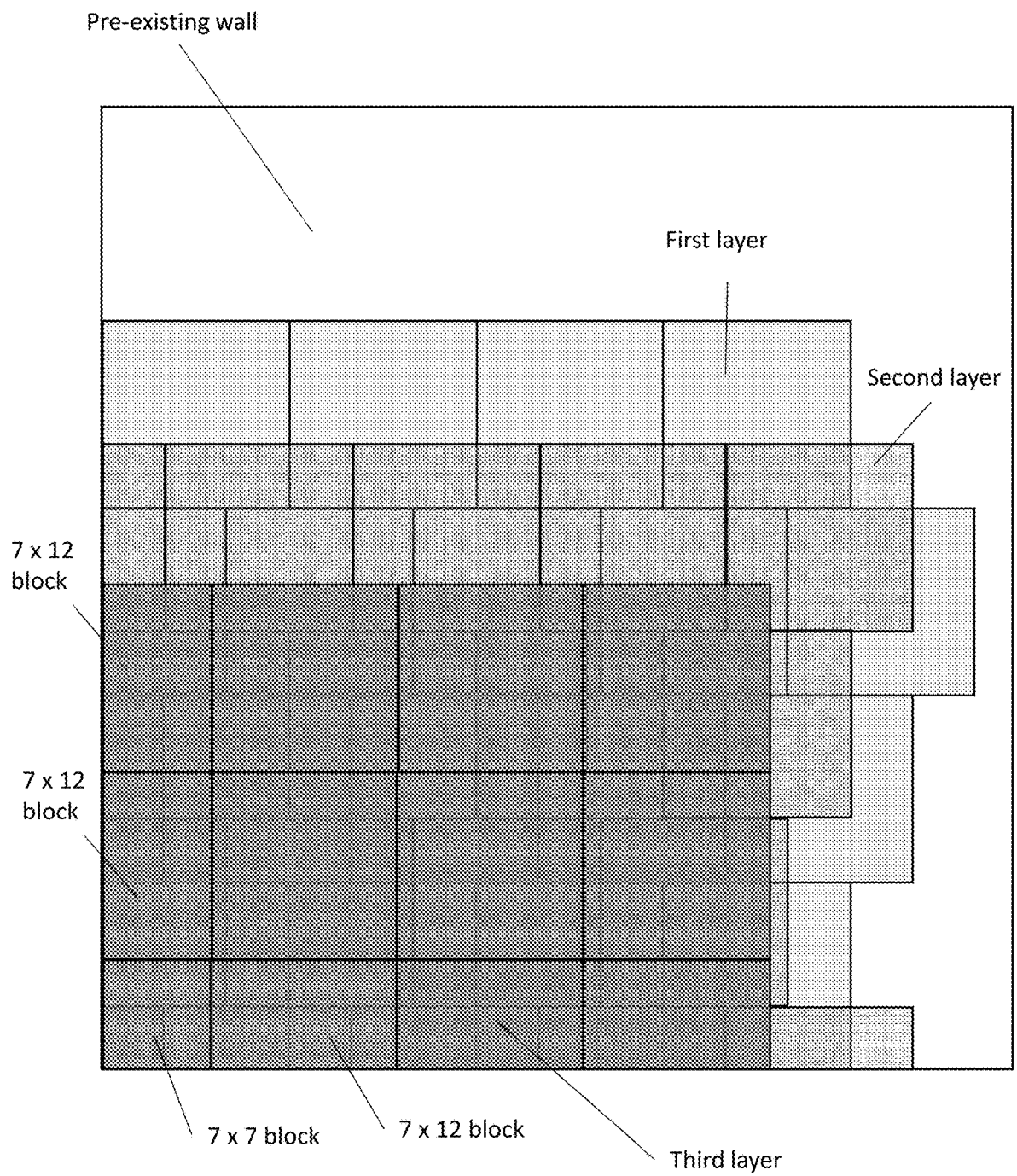
FIG. 17 illustrates a front view of a wall with three layers of ballistic paver blocks according to one embodiment of the present invention.

Step 2016—Apply a second layer of ballistic paver blocks. In a preferred embodiment of the present invention, the second layer of ballistic paver blocks are offset from the first layer of ballistic paver blocks so that none of the horizontal seams of the second layer of ballistic paver blocks align with the horizontal seams of the first layer of ballistic paver blocks FIG. 17 illustrates a front view of a wall with a first and second layer of ballistic paver blocks according to one embodiment of the present invention. By way of example and not limitation, the first row of the second layer consists of ballistic paver blocks that are 4 inches by 12 inches by 3 inches rather than the ballistic paver blocks measuring 12 by 12 by 3 used in the first layer. This offsets the horizontal seams by 4 inches.

Additionally, the ballistic paver blocks are placed so that none of the vertical seams on the second layer of ballistic paver blocks matches up with the vertical seams of the first layer of ballistic paver blocks. In one embodiment of the present invention, a first ballistic paver block of 4 by 4 by 3 inches is used and 4 by 12 by 3 inch ballistic paver blocks are used for the remainder of the first row across the floor. The second layer is shown semi-transparent in FIG. 17. The next row is offset a different amount than the second row of the first layer. Therefore the second row of the second layer is offset 8 inches rather than the 4 inch lateral offset of the second row of the first layer. For example, an 8×12 inch first block is used, with subsequent blocks being 12×12. This process continues with ballistic paver blocks of the second layer being adhered to the first layer of ballistic paver blocks and the last ballistic paver block in each row being field cut to fill the remaining space. The top row of ballistic paver blocks is field cut to fit the gap between the second to last row and the ceiling. One skilled in the art will realize that there are many variations of the present invention depending on the number of ballistic paver blocks available, size of wall, level of bullet protection needed, etc.

Figure 18:
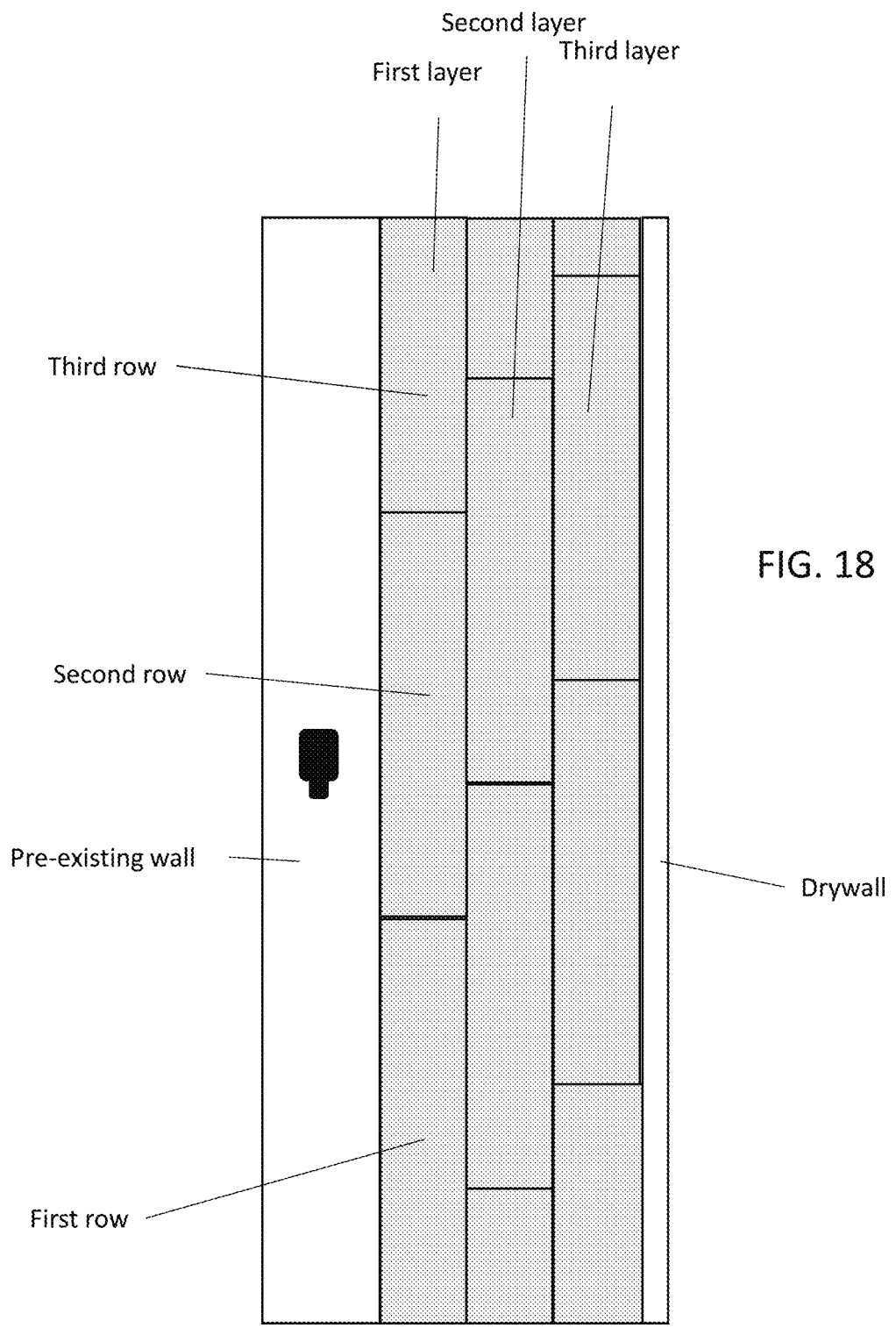
FIG. 18 illustrates a side view of a finished wall with three layers of ballistic paver blocks and drywall according to one embodiment of the present invention.

Step 2020—Apply the third layer of ballistic paver blocks. In a preferred embodiment of the present invention, the ballistic paver blocks of the third layer are arranged so that the vertical and horizontal seams for the third row of ballistic paver blocks do not match the vertical or horizontal seams of the second or first layers of ballistic paver blocks. By way of example and not limitation, one embodiment of the present invention consists of a 7 inch square ballistic paver block at the start edge on the floor and then completing the first row with 7 inch by 12 inch ballistic paver blocks laid with the 12 inch side parallel to the floor. FIG. 18 illustrates a front view of a wall with three layers of ballistic paver blocks according to one embodiment of the present invention. The third layer is shown semi-transparent in FIG. 18. The subsequent rows of ballistic paver blocks on the third layer all start with a 7×12 inch ballistic paver block. One skilled in the art will realize that there are many variations of the present invention depending on the number of ballistic paver blocks available, size of wall, level of bullet protection needed, etc.

One of skill in the art will recognize that the offsets used to start the second or third layer may be used for the first layer. The sequence of layer offsets is not important so the repeating pattern of offsets from vertical row to vertical row could be (0, 4, 8) (4, 8, 0); (8, 0, 4) (8, 4, 0) (4, 0, 8) or (0, 8, 4).

Step 2024—Finish the outer surface of the top layer of pavers. In one embodiment of the present invention the wall is finished with drywall. The drywall is attached to the top layer of ballistic paver blocks using masonry screws. Alternatively the drywall can be attached using other methods. By way of example and not limitation, the drywall can be attached with adhesives. In another embodiment of the present invention the wall is finished with other surface treatments. By way of example and not limitation, the wall can be finished with paint. FIG. 18 is a side view of a finished wall with three layers of ballistic paver blocks and drywall.

Alternate embodiments of the present invention include augmenting the exterior face of walls. In one embodiment of the present invention, ballistic paver blocks on exterior side of an exterior wall are covered with conventional facades including, by way of example and not limitation, brick, stucco, or masonry board. In another embodiment the exterior ballistic paver blocks are covered for ornamental appearance. Alternatively the ballistic paver blocks are covered to tactically conceal the location of augmented walls.

Test Results

A bullet resistant wall with three layers of 12 inch by 12 inch by 3 inch ballistic paver blocks with offsetting vertical and horizontal seams, according to one embodiment of the present invention, was shot repeatedly with a NATO M80 round (7.62 NATO) using an Armalite AR-10 rifle with a 20 inch barrel. The shots were filed substantially perpendicular to the augmented wall. The distance from the gun to the wall was well under 82 feet and is thus unimportant as the velocity of such a bullet is constant for the first 82 feet. The depths of penetration of the bullets measured from the outermost ballistic paver block to the trailing end of the projectile were in the range of 2.5 to 3 inches. This is a small fraction of the 9 inch total depth of ballistic paver blocks according to this embodiment of the present invention, so a second shot that hit the same bullet hole would not be able to traverse the ballistic paver blocks.

Alternative and Variations

In an alternate embodiment of the present invention, the ballistic paver blocks are applied to numerous walls to create a safe room. A safe room is a place where staff and visitors or students retreat when there is an active shooter situation. It is preferred that the safe room have a door that is itself resistant to bullets or other projectiles such as from a grenade.

While this disclosure has described a system that uses three layers of 3 inch thick ballistic paver blocks, other combinations are possible. Those of skill in the art will recognize that not all three layers of ballistic paver blocks need be the same thickness. A designer may choose to use two layers of ballistic paver blocks that are 4 inches thick and one layer of ballistic paver blocks that is 2 inches thick. The total of the layers does not have to add up to 9 inches. Depending on the type of anticipated threat, the budget for the project, and the practical constraints of how much space can be consumed in a preexisting space, 9 inches may not be the selected choice. An area that is only seeking to be hardened against hand guns as it is unlikely that a rifle could be carried to that location may choose a lower level of bullet resistance to add to interior walls.

A location seeking to harden exterior walls for a possible threat from a 50 caliber sniper round might seek a larger total depth for the set of layers. A location that may receive a number of bullets in a small area of wall such as from a fully automatic weapon or a machine gun may seek to have a larger total depth for the set of layers.

The current disclosure expresses that a preferred embodiment has three or more layers of ballistic paver blocks. Specifically, there is a preference for having three layers of 3 inch depth rather than two layers of 4.5 inch depth. The advantage to numerous layers is that a bullet that happens to hit a seam may penetrate through the seam more easily than had the bullet not hit the seam. Allowing a bullet to travel through a seam and then having just one layer beyond that seam to stop the bullet might increase the risk that a bullet might penetrate the augmented wall.

In a preferred embodiment of the present invention, the augmented wall contains no additional metal in the form of metal plates or shielding. While it is well known in the prior art references to incorporate metal for adding projectile resistance to structures, this is expensive and labor intensive. Additionally, the added metal increases the weight of the final product. The present invention achieves the same, or better, level of protection from bullets and projectiles without the added cost, labor, or weight associated with utilizing metal components in the wall.

While the present disclosure expresses a preferred embodiment consisting of ballistic concrete pavers for all of the multiple layers, one of skill in the art could choose to have one or more layers of non-ballistic concrete pavers with one or more layers of ballistic concrete pavers. By way of example and not limitation, the first two layers of ballistic paver blocks are followed by a non-ballistic paver block layer. Alternatively, a first layer of non-ballistic pavers is followed by one or more subsequent layers of ballistic concrete. Alternatively the non-ballistic paver is in-between two layers of ballistic paver blocks. It is of note that having the outer layers formed with ballistic concrete will reduce ricochets and spalling.

Alignment of Seams

While the present disclosure taught the advantages of having three layers with the ballistic paving blocks on each layer offset from one another so that the vertical seams and horizontal seams on any one layer did not overlap a different layer, this is not absolutely required in order to obtain many of the benefits of the present disclosure.

If the vertical and horizontal offsets are one third of the dimension of an uncut square ballistic panel block, then embodiments of the present invention which incorporate four layers of ballistic paver blocks is going to repeat the seam pattern in two layers.

A user may choose to have offsets of one half of an uncut square block so that the third layer repeats the seam pattern of the first layer. While this is not preferred embodiment, the chances of a bullet going through the seam on the outermost layer, passing through the middle layer where there is no seam and hitting exactly the seam on the bottom layer is low.

Use of Tongue and Groove Pavers

The use of tongue and groove for ballistic barriers to address the concern with seams is known. See U.S. Design Pat. No. D662,225 issued Jun. 19, 2012, which is hereby incorporated by reference in its entirety.

The use of tongue and groove could be used with ballistic paver blocks but is not preferred. Adding tongue and groove complicates the molding process with a ballistic paver block that is only a few inches thick. Specifically, the thin sections of tongue or grooves would be at risk of breaking. Additionally, tongue and groove would be more sensitive to imperfections from walls and floors that are imperfectly aligned. Tongue and groove would add complications when field cutting the pieces to create the seam offsets from layer to layer. However, especially if thicker ballistic panel blocks were used, tongue and groove might have appeal to some users.

In another embodiment of the present invention, the edges of the ballistic paver blocks are tapered. By way of example and not limitation, the vertical edges of the ballistic paver blocks are cut at a 45 degree angle to form beveled edges. FIG. 19 illustrates an example embodiment of blocks with two beveled edges according to the present invention.

This reduces the assembly and manufacturing difficulties associated with tongue and groove blocks while providing enhanced protection from bullets or projectiles that hit the seam.

Protection Against Explosive Devices

This disclosure has disclosed a method of creating a wall that is hardened to make it unlikely that certain types of bullets fired from guns will traverse the wall protection. Nothing in this disclosure should be interpreted as limiting the use of the ballistic paver blocks to thwart only bullets but not shrapnel from grenades and various explosive devices such as a backpack bomb, a pressure cooker bomb such as used in the 2013 attack at the Boston Marathon, or other devices which may be called an improvised explosive device. The benefits of the present disclosure include hardening walls to resist penetration of the wall from materials propelled from an explosive device.

Outlets and other Utilities

In some instances an interior wall to be augmented with layers of ballistic paver blocks will have outlets for electricity, telephone or computer connections, or other utilities. Alternatively, an exterior wall may have a water spigot. In some instances, the choice will be made to retain these various utilities and cut the ballistic panel blocks to allow the old connections to be reached. In other instances, the utilities such as electrical or communication jacks will be extended and placed on the new inside wall. In one embodiment, the wires are placed in a conduit to reduce the opening to be left in the layers of ballistic paver blocks. Those of skill in the art will recognize that a bullet that finds the openings through the layers of ballistic panel blocks may traverse the wall and cause harm. The chances of a random shooter hitting a conduit path for an outlet from the other side of the wall is limited as there is not likely to be any indication on that side of the wall where the outlet or other utilities are located on the inside of the wall. A shooter is not likely to target a spigot on the exterior of the building.

Window Height Walls

In an augmented wall that incorporates windows, one embodiment of the present invention leaves the windows but adds layers of ballistic panel pavers to either surround the windows or to simply rise from the floor to the bottom edge of the windows. Alternatively, the ballistic paver blocks are added to the bottom 3 feet of the wall. Alternatively, the ballistic paver blocks are added to the bottom 6 feet of the wall. Alternatively the ballistic paver blocks are added to the wall at a height that coincides with the budget for the augmentation. These alternative embodiments are advantageous because persons in the room would be able to drop to the ground and be protected by the enhanced wall even while bullets striking the windows and possibly the upper non-augmented section of walls may be penetrated, while also augmenting the wall in the most cost-effective way.

Certain modifications and improvements will occur to those skilled in the art upon a reading of the foregoing description. All modifications and improvements have been deleted herein for the sake of conciseness and readability but are properly within the scope of the following claims.

The invention claimed is:

1. A ballistic panel comprising:
the ballistic panel including a void;
wherein the void in the ballistic panel is filled with a ballistic replacement material such that the ballistic panel includes a filled void including the ballistic replacement material;
wherein the ballistic replacement material is formed from wet ballistic concrete prepared without preformed foam; and
wherein the filled void exhibits ballistic properties equivalent to the ballistic panel.

2. The ballistic panel of claim 1, wherein the ballistic replacement material is formed from a material with substantially uniform density.

3. The ballistic panel of claim 2, wherein the substantially uniform density of the ballistic replacement material is between about 1121 kg/cubic meter (about 70 pounds per cubic foot) and about 1442 kg/cubic meter (about 90 pounds per cubic foot).

4. The ballistic panel of claim 1, wherein the ballistic replacement material does not delaminate from adherence to the ballistic panel.

5. The ballistic panel of claim 1, wherein the ballistic replacement material is shatter-resistant when struck with a bullet between about 4 mm (.172 caliber) and about 12.7 mm (50 caliber), moving at between about 120 m/sec (390 ft/sec) and about 1,200 m/sec (3,900 ft/sec).

6. The ballistic panel of claim 1, wherein the ballistic replacement material comprises about 1 part by mass cement, about 0.5 to 1.5 part by mass of a fine aggregate, and about 0.0005 to 0.05 part by mass of an air entrainment additive.

7. The ballistic panel of claim 5, wherein the ballistic replacement material further comprises about 0.005 to 0.05 part by mass aluminum hydroxide and about 0.005 to 0.05 part by mass calcium phosphate.

8. The ballistic panel of claim 5, wherein the ballistic replacement material further comprises about 0.005 to 0.15 part by mass fiber.

9. The ballistic panel of claim 5, wherein the ballistic replacement material includes air bubbles resulting from the air entrainment additive that are less than about 0.04 inches (1 mm) in diameter or greater than about 0.0004 inches (10 microns) in diameter.

10. The ballistic panel of claim 5, wherein the ballistic replacement material includes air bubbles resulting from the air entrainment additive that are between about 0.0004 inches (10 microns) in diameter and about 0.04 inches (1 mm) in diameter.

11. The ballistic panel of claim 5, wherein the ballistic replacement material includes air bubbles resulting from the air entrainment additive that are less than about 0.04 inches (1 mm) in diameter.

12. The ballistic panel of claim 5, wherein the ballistic replacement material includes air bubbles resulting from the air entrainment additive that are greater than 0.0004 inches (10 microns) in diameter.

13. The ballistic panel of claim 1, wherein the void is created by projectiles.

14. The ballistic panel of claim 1, wherein the ballistic replacement material is made without an addition of a wet foam comprising water, a foaming agent, and/or a foam stabilizing agent.

15. A ballistic panel comprising:
the ballistic panel including a void;
wherein the void in the ballistic panel is filled with a ballistic replacement material such that the ballistic panel includes a filled void including the ballistic replacement material;
wherein the ballistic replacement material is formed from a material with substantially uniform density;
wherein the ballistic replacement material is formed without preformed foam; and
wherein the ballistic replacement material comprises about 1 part by mass cement, about 0.5 to 1.5 part by mass fine aggregate, and about 0.0005 to 0.05 part by mass air entrainment additive.

16. The ballistic panel of claim 15, wherein the filled void exhibits ballistic properties equivalent to the ballistic panel.

17. The ballistic panel of claim 15, wherein a density of the ballistic replacement material comprises between about 1121 kg/cubic meter (about 70 pounds per cubic foot) and about 1442 kg/cubic meter (about 90 pounds per cubic foot).

18. The ballistic panel of claim 15, wherein the void is created by projectiles.

19. A ballistic panel comprising:
the ballistic panel including a void;
wherein the void in the ballistic panel is filled with a ballistic replacement material such that the ballistic panel includes a filled void including the ballistic replacement material; and
wherein the ballistic replacement material is formed without preformed foam.

20. The ballistic panel of claim 19, wherein the ballistic replacement material is formed from a material with substantially uniform density.

* * * * *